(12) United States Patent
Iwasawa

(10) Patent No.: US 7,218,455 B2
(45) Date of Patent: May 15, 2007

(54) ZOOM LENS AND IMAGING APPARATUS

(75) Inventor: Yoshito Iwasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/455,038

(22) Filed: Jun. 19, 2006

(65) Prior Publication Data
US 2007/0002461 A1  Jan. 4, 2007

(30) Foreign Application Priority Data
Jun. 27, 2005  (JP) .............................. 2005-186572

(51) Int. Cl.
G02B 15/14  (2006.01)
G02B 27/64  (2006.01)

(52) U.S. Cl. ............... 359/680; 359/681; 359/682; 359/683; 359/686; 359/689; 359/715; 359/716; 359/740; 359/749; 359/761; 359/770; 359/781; 359/557

(58) Field of Classification Search ............... 359/557, 359/680–682, 683, 686, 689, 715, 716, 740, 359/749–753, 761, 770, 781
See application file for complete search history.

(56) References Cited

U.S. PATENT DOCUMENTS

2005/0018313 A1* 1/2005 Kuba .................... 359/676

2006/0056044 A1* 3/2006 Iwasawa .................. 359/676

FOREIGN PATENT DOCUMENTS

JP  2003-130043 A   5/2003
JP  3486532 B2   10/2003
JP  2004-266322 A   9/2004

* cited by examiner

Primary Examiner—Evelyn A. Lester
(74) Attorney, Agent, or Firm—Rader Fishman & Grauer PLLC; Ronald P. Kananen

(57) ABSTRACT

A zoom lens having at least a first lens group including a reflection member for bending an optical axis fixedly during zooming and having a negative refractive power, a second lens group having a negative refractive power, and a third lens group arranged in the order from an object side is provided. In the zoom lens, an image can be shifted into a direction perpendicular to the optical axis by moving either of the second and the third lens groups ("shift lens group") in a direction perpendicular to the optical axis, and a following conditional expression (1) is satisfied, $$0.5 < (1-\beta a) \times \beta b < 3.0, \quad (1)$$

where:
  $\beta a$: a magnification of the shift lens group in a maximum telephoto state, and
  $\beta b$: a magnification of a lens group arranged on an image surface side of the shift lens group in the maximum telephoto state.

6 Claims, 19 Drawing Sheets

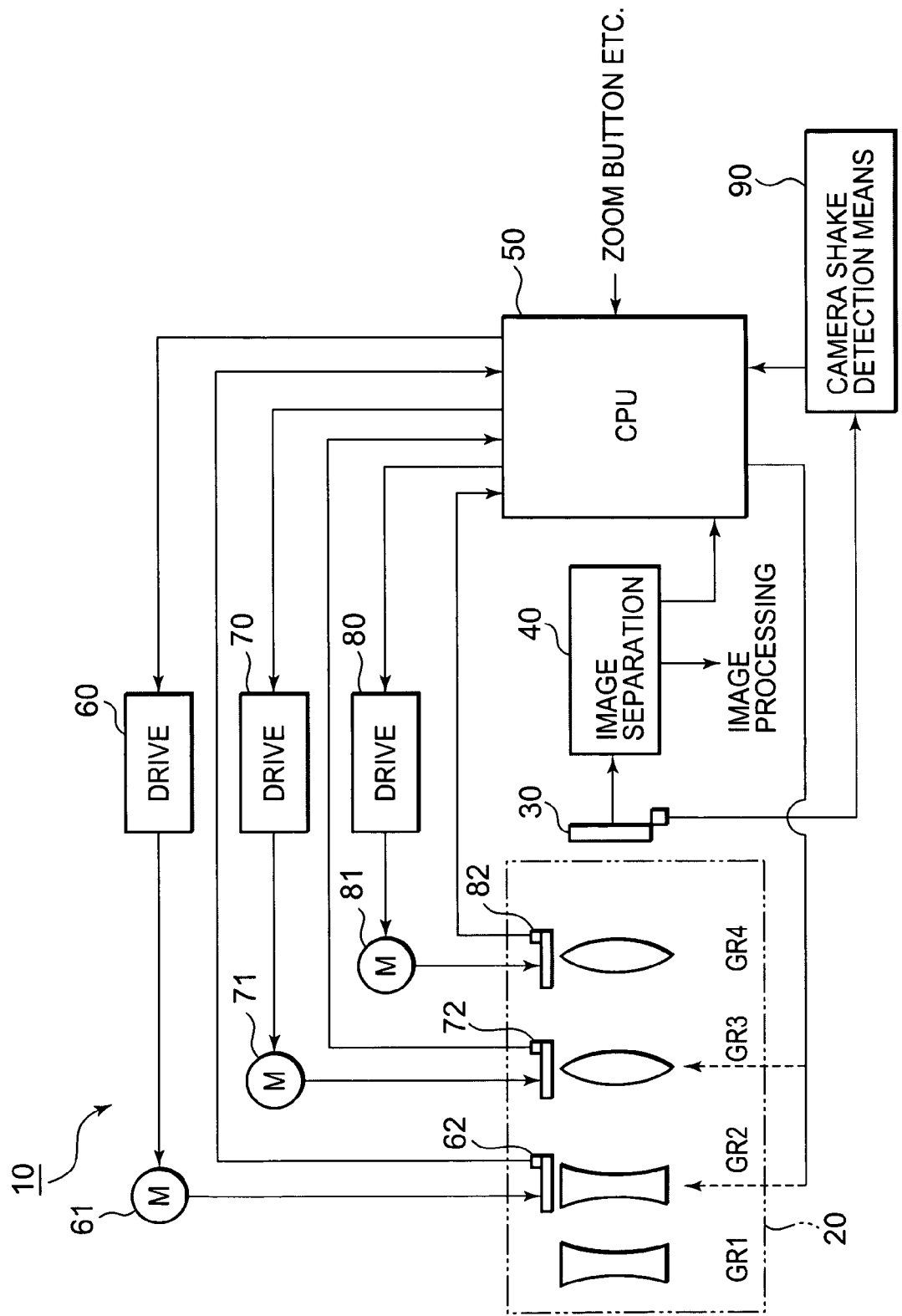

ZOOM LENS AND IMAGING APPARATUS

CROSS REFERENCES TO RELATED APPLICATIONS

The present document contains subject matter related to Japanese Patent Application JP 2005-186572 filed in the Japanese Patent Office on Jun. 27, 2005, the entire contents of which being incorporated herein by reference.

BACKGROUND OF THE INVENTION

1. Field of the Invention

The present invention relates to a novel zoom lens and a novel imaging apparatus. In particular, the present invention relates to a zoom lens and an imaging apparatus equipped with the zoom lens. The zoom lens includes the function of correcting or reducing the blurring of a photographed image owing to camera shaking, or a camera shake correction/reduction function. The zoom lens is suitable for a photographing optical system of digital input-output equipment such as a digital still camera, a digital video camera and the like, and is compact, which achieves dimensions being thin in the depth direction of a camera.

2. Description of Related Art

In recent years, an imaging apparatus using a solid state imaging device, such as a digital still camera and the like, has been spreading. The imaging apparatus has been requested to have a higher image quality along with such wide spread of the digital still camera. In particular, for a digital still camera having a large number of pixels, for example, a photographing lens, especially a zoom lens adaptable to a solid state imaging device having a large number of pixels and has an excellent image forming performance has been sought. Moreover, the demands for miniaturization is also strong, and especially a zoom lens small-sized in the depth direction thereof is sought.

Moreover, the camera shake correction function preventing or reducing image blurring of a photographed image caused by camera shake at the time of photographing is also sought strongly.

For example, Japanese Patent Publication No. 3486532 proposes a zoom lens composed of a first lens group having a negative refractive power, a second lens group having a positive refractive power, a third lens group having a positive refractive power, and a fourth lens group having a positive or negative refractive power, the zoom lens performing camera shake correction by moving the third lens group in a direction perpendicular to an optical axis.

Moreover, on the other hand, there has been proposed a zoom lens arranging a reflection member for bending the optical path in the first lens group to achieve the miniaturization in the depth direction, i.e. the shaping to be thin.

Accordingly, it is considerable to arrange the reflection member for bending the optical path in the first lens group and to shift an image by moving the whole or a part of the lens groups arranged on the image side of the first lens group in a direction perpendicular to the optical axis.

However, as described above, it is difficult to acquire a zoom lens having a sufficient optical performance only by simply combining the thin-shaped formation by the bending of the optical path in the reflection member and the image shifting method by lens shifting. In particular, aberration deterioration caused by decentrating of each composed lens group becomes large. That is, if it is tried to satisfy the image forming performance corresponding to a large number of pixels, assemblability with a high precision is required.

SUMMARY OF THE INVENTION

In view of the problem as described above, there is a need for a zoom lens having a camera shake correction/reduction function, and suitable for a photographing optical system of digital input-output equipment such as a digital still camera, a digital video camera and the like, which is compact, achieves dimensions being thin in the depth direction of a camera, and has good assemblability, and an imaging apparatus equipped with the zoom lens. It is noted that, in the present specification, the term "camera shake correction" involves the meaning of "camera shake reduction" in addition to its original meaning.

For satisfying the need, according to an embodiment of the present invention, a zoom lens includes: at least a first lens group, a second lens group and a third lens group, arranged in this order from an object side. The first lens group includes a reflection member for bending an optical axis fixedly during zooming and has a negative refractive power. The second lens group has a negative refractive power. In the zoom lens, an image can be shifted in a direction perpendicular to the optical axis by moving either of the second and the third lens groups (hereinafter referred to as a "shift lens group") in a direction perpendicular to the optical axis. In addition, conditional expression (1): $0.5<(1-\beta a)\times\beta b<3.0$ is satisfied, where $\beta a$ denotes a magnification of the shift lens group in a maximum telephoto state and $\beta b$ denotes a magnification of a lens group arranged on an image surface side of the shift lens group in the maximum telephoto state.

Consequently, in the zoom lens of the embodiment of the present invention, camera shake correction can be performed, and a camera can have dimensions being thin in the depth direction thereof, namely can be miniaturized in the incident optical axis direction.

Consequently, the zoom lens of the embodiment of the present invention can perform camera shake correction, and can be shaped to be thin. Moreover, the zoom lens can prevent the growing in size of the drive mechanism of the shift lens group, and can easily control a shift quantity of the shift lens group for the camera shake correction.

Moreover, an imaging apparatus according to another embodiment of the present invention uses the zoom lens of the embodiment of the present invention.

Thereby, the imaging apparatus can perform camera shake correction, and the imaging apparatus can be shaped to be small by preventing the growing of the size of the mechanism of driving the shift lens group. Moreover, the imaging apparatus can be formed to be thin. Furthermore, it is easy to control the shift quantity of the shift lens group for the camera shake correction.

According to still another embodiment of the present invention, the first lens group having the negative refractive power, the second lens group having the negative refractive power, the third lens group having a positive refractive power, and a fourth lens group having a positive refractive power are arranged in the order from the object side, and consequently the zoom lens has a well balanced image forming performance.

According to further another embodiment of the present invention, if it is supposed that f1 denotes a focus distance of the first lens group and f2 denotes a focus distance of the second lens group, the focus distances f1 and f2 satisfy a conditional expression (2): $0.1<|f1/f2|<1.2$. Consequently, the growing in a front lens diameter can be prevented, and the correction of distortion can be performed in a good state.

Furthermore, the occurrence quantity of aberration at the time of camera shake correction can be suppressed.

According to another embodiment of the present invention, if it is supposed that f1 denotes a focus distance of the first lens group and fw denotes a focus distance of the whole lens system in a maximum wide angle state, the focus distances f1 and fw satisfy a conditional expression (3): $3.8<|f1/fw|<5.0$. Consequently, the growing in the sizes of a front lens diameter and the reflection member can be prevented, and the correction of distortion can be performed in a good state.

The imaging apparatus according to the above embodiment may further have camera shake detection means, camera shake correction control means and a camera shake correction drive unit. The camera shake detection means detects a shake of the imaging device. The camera shake control means calculates a shake correction angle for correcting image blurring caused by the shake of the imaging device detected by the camera shake detection means to transmit a drive signal to a drive unit so as to situate the shift lens group at a position based on the shake correction angle. The camera shake drive unit shifts the shift lens group in a direction perpendicular to the optical axis based on the drive signal. Consequently, the imaging apparatus can correct the blurring of an image caused by a shake of the imaging device caused by a camera shake, and the imaging apparatus can acquire a high quality image, which is in a good in-focus state and has corrected various aberrations in a good state.

BRIEF DESCRIPTION OF THE DRAWINGS

FIG. 2 shows spherical aberrations, astigmatisms and distortions in a maximum wide angle state;

FIG. 6 shows spherical aberrations, astigmatisms and distortions in a maximum wide angle state;

FIG. 10 shows spherical aberrations, astigmatisms and distortions in a maximum wide angle state;

FIG. 14 shows spherical aberrations, astigmatisms and distortions in a maximum wide angle state;

FIG. 18 shows spherical aberrations, astigmatisms and distortions in a maximum wide angle state;

FIG. 22 shows spherical aberrations, astigmatisms and distortions in a maximum wide angle state;

FIG. 25 is a block diagram showing an imaging apparatus of an embodiment of the present invention.

DETAILED DESCRIPTION OF EMBODIMENTS

Figure 1:
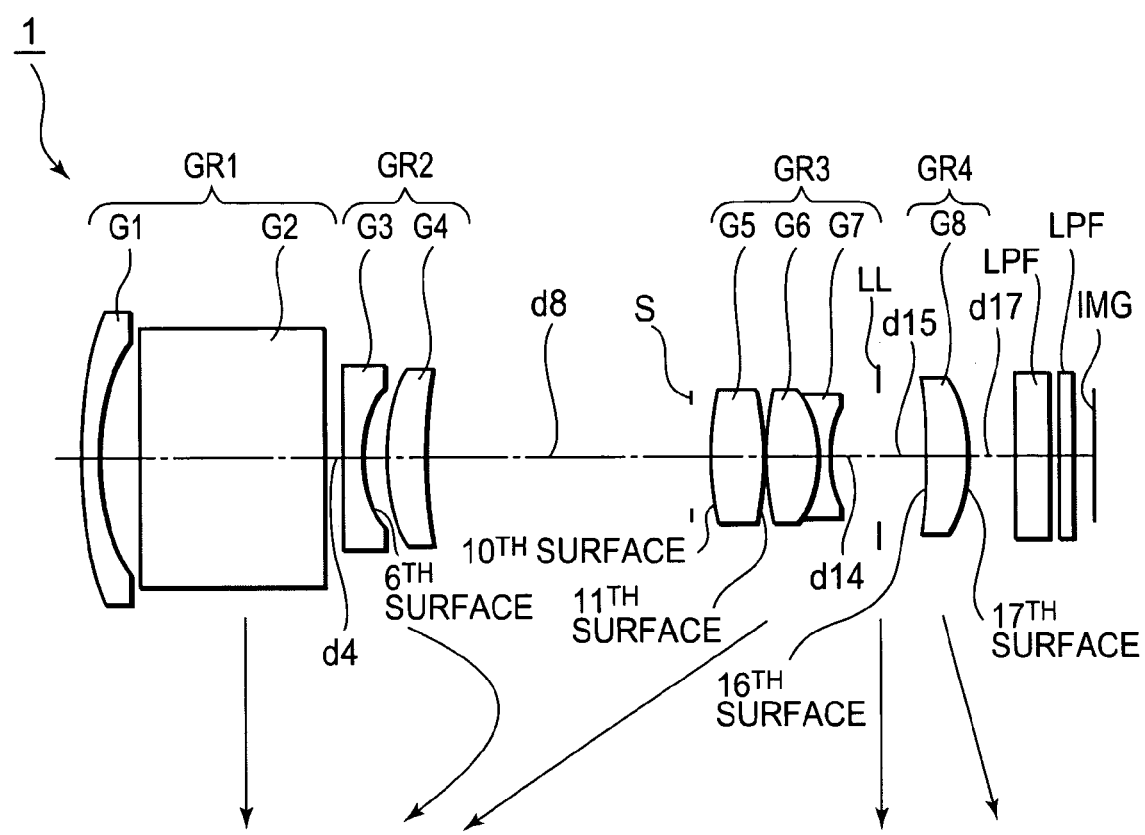
FIG. 1 is a diagram showing a lens configuration of a zoom lens of a first embodiment of the present invention.

In the following, a zoom lens and an imaging apparatus of embodiments for implementing the present invention are described with reference to the attached drawings.

A zoom lens according to an embodiment of the present invention includes: at least a first lens group; a second lens group; and a third lens group, arranged in this order from an object side. The first lens group includes a reflection member for bending an optical axis fixedly during zooming, and has a negative refractive power. The second lens group has a negative refractive power. In the zoom lens, an image can be shifted in a direction perpendicular to the optical axis by moving either of the second and the third lens groups (hereinafter referred to as a "shift lens group") in a direction perpendicular to the optical axis. In addition, a conditional expression (1): $0.5<(1-\beta a)\times\beta b<3.0$ is satisfied, where $\beta a$ denotes a magnification of the correcting lens group in a maximum telephoto state and $\beta b$ denotes a magnification of a lens group arranged on an image surface side of the shift lens group in the maximum telephoto state.

Moreover, it is preferable that a fourth lens group having a positive refractive power is arranged on the image side of the third lens group, and that the third lens group has a positive refractive power.

In the zoom lens of the embodiment of the present invention, because the first lens group includes the reflection member for bending the optical axis, it becomes possible to form the zoom lens in a thin shaped state, namely to realize the miniaturization in the incident optical axis direction, by bending the optical axis to the incident optical axis.

The conditional expression (1) is a conditional expression regulating rates of the shift quantities of an image to the movement quantities of the shift lens group. If the rate becomes less than the lower limit value of the conditional expression (1), the movement quantity necessary for shifting an image by a predetermined quantity becomes large, and the drive system of the shift lens group becomes large to prevent miniaturization. Moreover, if the rate becomes larger than the upper limit value of the conditional expression (1), an image shifts large even if the shift lens group slightly moves. Consequently the control in high precision is required.

It is preferable that the zoom lens of the embodiment of the present invention satisfies the following conditional expression (2), where it is supposed that f1 denotes the focus distance of the first lens group and f2 denotes the focus distance of the second lens group, $$0.1<|f1/f2|<1.2. \quad (2)$$

The conditional expression (2) is a conditional expression regulating rates between the focus distance of the first lens group and the focus distance of the second lens group. If the rate becomes less than the lower limit value of the conditional expression (2), the focus distance of the first lens group becomes short, and it becomes difficult to correct the distortion. If the rate becomes larger than the upper limit value of the conditional expression (2), the focus distance of the first lens group becomes long, and the increase of a front lens diameter is caused. Consequently, the miniaturization becomes difficult, and the focus distance of the second lens group becomes short to raise the decentrating sensitivity of the second lens group, which enlarges the occurrence quantity of aberration at the time of a camera shake correction.

It is preferable that the zoom lens of the present invention satisfies the following conditional expression (3):

$$3.8<|f1/fw|<5.0,$$

where it is supposed that f1 denotes the focus distance of the first lens group and fw denotes the focus distance of the whole lens system in the maximum wide angle state.

The conditional expression (3) is a conditional expression regulating the rates between the focus distance of the first lens group and the focus distance of the whole lens system in the maximum wide angle state. If the rate becomes less than the lower limit value of the conditional expression (3), the focus distance of the first lens group becomes short, and it becomes difficult to correct the distortion. If the rate becomes larger than the upper limit value of the conditional expression (3), the focus distance of the first lens group becomes long, and the increase of the front lens diameter is caused. Therefore, the miniaturization of the reflection member becomes difficult.

If a prism is used as the reflection member included in the first lens group for bending the optical axis, it is preferable to use a glass material with a high refractive power. It is preferable to use the glass material having the refractive power of 1.7 or more, more preferably of 1.8 or more. Thereby, the reflection member can be miniaturized, and the front lens diameter can be reduced.

Although it is desirable to make a member for light amount adjustment intervene between the third lens group and the fourth lens group in the zoom lens of the present embodiment. However, if the member for light amount adjustment is integrated with the third lens group to be one body in a case of performing a camera shake correction by shifting the third lens group in the direction perpendicular to the optical axis, the weight of the member moving at the time of the camera shake correction becomes heavy, and the load of the drive mechanism for camera shake correction becomes large. Consequently, it is preferable that the member for light amount adjustment is independent of the third lens group.

In addition, as the member for light amount adjustment, it is preferable to use a mechanical shutter, an ND filter, a liquid crystal dimmer device and the like.

In the following, the zoom lens of the embodiments of the present invention and numerical examples in which specific numerical values are applied to each of the embodiments are described.

FIG. 1 shows a zoom lens 1 of a first embodiment of the present invention.

The zoom lens 1 is composed of a first lens group GR1 having a negative refractive power, a second lens group GR2 having a negative refractive power, a third lens group GR3 having a positive refractive power, and a fourth lens group GR4 having a light amount adjustment member LL and a positive refractive power, each arranged in the order from the object side. The first lens group GR1 is composed of a negative lens G1 and a rectangular prism G2 for bending an optical axis by 90°. The second lens group GR2 is composed of a negative lens G3 having an aspherical surface on the image side, and a positive lens G4. The third lens group GR3 is composed of a positive lens G5 having aspherical surfaces on both the surfaces thereof, and a cemented lens of a positive lens G6 and a negative lens G7. The fourth lens group GR4 is composed of a plastic positive lens G8 having aspherical surfaces on both the surfaces thereof. When a lens position state changes from the maximum wide angle state to the maximum telephoto state, the first lens group GR1 and the light amount adjustment member LL are fixed in the optical axis direction, and the second lens group GR2, the third lens group GR3 and the fourth lens group GR4 move on the optical axis into the directions shown by arrows in FIG. 1. Moreover, an image can be shifted in the direction perpendicular to the optical axis by moving either of the second lens group GR2 and the third lens group GR3 in the direction perpendicular to the optical axis.

It is noted that an aperture diaphragm S is arranged close to the object side of the third lens group GR3, and moves together with the third lens group GR3. A low-pass filter LPF is inserted between the fourth lens group GR4 and an imaging surface IMG.

As described above, the aspherical surfaces are used in the zoom lens 1 according to the first embodiment and the zoom lenses according to the other embodiments, which will be described later. The shapes of the aspherical surfaces are expressed by the following expression 1:

$$x = \frac{y^2 \cdot c^2}{1 + \sqrt{1 - \varepsilon \cdot y^2 \cdot c^2}} + \sum A^i \cdot y^i \quad (1)$$

where:

x: a distance from the vertex of a lens surface in the optical axis direction, y: a height in a direction perpendicular to the optical axis, c: a paraxial curvature at the vertex of the lens ε: conical constant, and $A^i$: an $i^{th}$ order aspherical coefficient.

Table 1 shows values of each element of a numerical example 1 in which specific numerical values are applied to the first embodiment described above. Surface No. in each element in the tables of the numerical example 1 and each numeral example indicates the surface of the $i^{th}$ surface counted from the object side. The code "R" indicates the curvature radius of the optical surface of the $i^{th}$ surface. The code "d" indicates the intervals of the surfaces on the axis between the $i^{th}$ optical surface and the $(i+1)^{th}$ optical surface from the object side. The code "nd" indicates a refractive power to the d line (λ=587.6 nm) of a glass material having the $i^{th}$ optical surface on the object side. The code "vd" indicates an Abbe number to the d line of a glass material having the $i^{th}$ optical surface on the object side. Moreover, ASP indicates that the optical surface is an aspherical surface, and INFINITY indicates that the optical surface is a flat surface.

TABLE 1

| SURFACE No. | R | d | nd | vd |
|---|---|---|---|---|
| 1 | 27.397 | 0.800 | 1.88300 | 40.805 |
| 2 | 12.619 | 2.380 | | |
| 3 | INFINITY | 10.800 | 1.84666 | 23.785 |
| 4 | INFINITY | d4 | | |
| 5 | INFINITY | 1.200 | 1.80611 | 40.734 |
| 6 | 7.720(ASP) | 1.277 | | |
| 7 | 11.781 | 2.420 | 1.84666 | 23.785 |
| 8 | 83.023 | d8 | | |
| 9 | DIAPHRAGM | 1.200 | | |
| 10 | 9.340(ASP) | 2.980 | 1.58313 | 59.461 |
| 11 | −12.556(ASP) | 0.189 | | |
| 12 | 23.184 | 2.761 | 1.88300 | 40.805 |
| 13 | −5.745 | 0.600 | 1.68893 | 31.161 |
| 14 | 5.289 | d14 | | |

TABLE 1-continued

| SURFACE No. | R | d | nd | vd |
|---|---|---|---|---|
| 15 | LIGHT AMOUNT ADJUSTMENT MEMBER | d15 | | |
| 16 | −30.024(ASP) | 2.400 | 1.52470 | 56.236 |
| 17 | −10.101(ASP) | d17 | | |
| 18 | INFINITY | 1.900 | 1.51680 | 64.198 |
| 19 | INFINITY | 0.600 | | |
| 20 | INFINITY | 0.700 | 1.51680 | 64.198 |
| 21 | INFINITY | | | |

A surface interval between the first lens group GR1 and the second lens group GR2 is d4, between the second lens group GR2 and the aperture diaphragm S is d8, between the third lens group GR3 and the light amount adjustment member LL is d14, between the light amount adjustment member LL and the fourth lens group GR4 is d15, and between the fourth lens group GR4 and the low-pass filter LPF is d17. As a change of the lens position state from the maximum wide angle state to the maximum telephoto state, these surface intervals d4, d8, d14, d15 and d17 change. Accordingly, Table 2 shows each value of each surface interval in the numerical example 1 in the maximum wide angle state, at an intermediate focus distance between the maximum wide angle state and the maximum telephoto state, and in the maximum telephoto state together with an F number FNo., a focus distance f and a half angle of view ω.

TABLE 2

FNo. = 2.86~4.11~5.15
f = 5.70~10.83~16.53
ω = 32.27~17.42~11.48
d4 = 0.800~4.659~1.407
d8 = 15.015~4.008~1.111
d14 = 2.700~9.548~15.697
d15 = 2.973~4.407~4.538
d17 = 2.765~1.331~1.200

Each lens surface of a 6th surface, a 10th surface, an 11th surface, a 16th surface and a 17th surface is composed of an aspherical surface r6, r10, r11, r16 and r17, respectively. The aspherical coefficient of each of the surfaces in the numerical example 1 is as shown in Table 3. In addition, in Table 3 and the following tables showing aspherical coefficients, "E-i" indicates an exponent expression based on 10 as the base, namely indicates "$10^{-i}$", and, for example, "0.12345E−05" indicates "$0.12345 \times 10^{-5}$."

TABLE 3

| SURFACE No. | ε | $A^4$ | $A^6$ | $A^8$ | $A^{10}$ |
|---|---|---|---|---|---|
| 6 | 1 | −0.239311E−03 | 0.318624E−05 | −0.379914E−06 | 0.892399E−08 |
| 10 | 1 | −0.757490E−03 | 0.193278E−05 | −0.126270E−05 | 0.387595E−07 |
| 11 | 1 | 0.572216E−04 | 0.100710E−04 | −0.149039E−05 | 0.624086E−07 |
| 16 | 1 | −0.357224E−03 | −0.152300E−04 | 0.330159E−06 | 0.426738E−07 |
| 17 | 1 | 0.183707E−03 | −0.310891E−04 | 0.141807E−05 | 0.000000E+00 |

Figure 2:
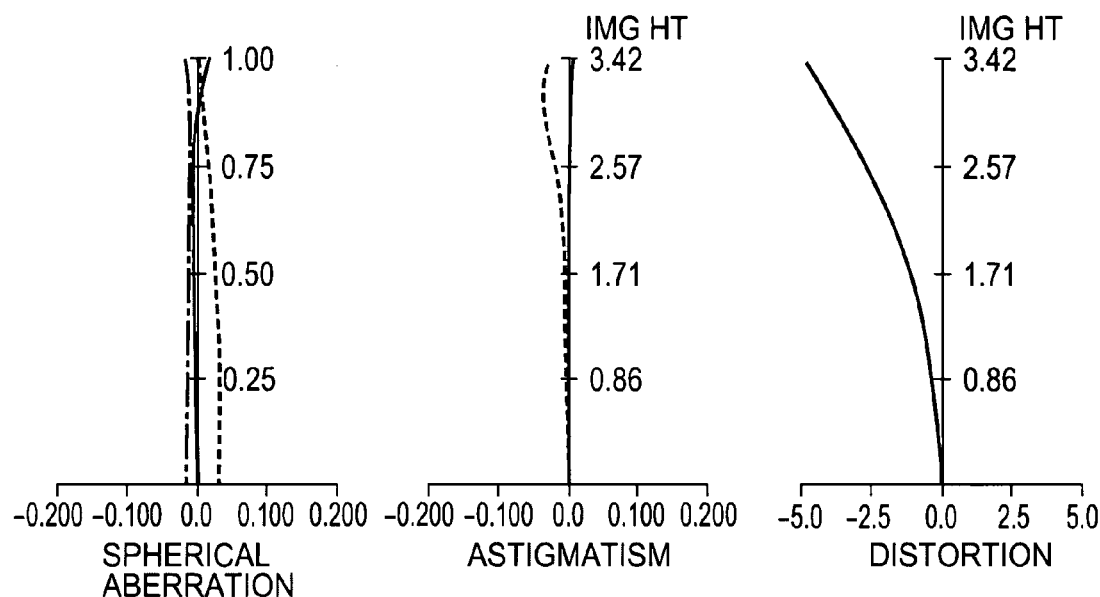
FIG. 2 is diagrams showing various aberrations of a numerical example 1 obtained by applying specific numerical values to the zoom lens of the first embodiment of the present invention together with FIGS. 3 and 4.
Figure 3:
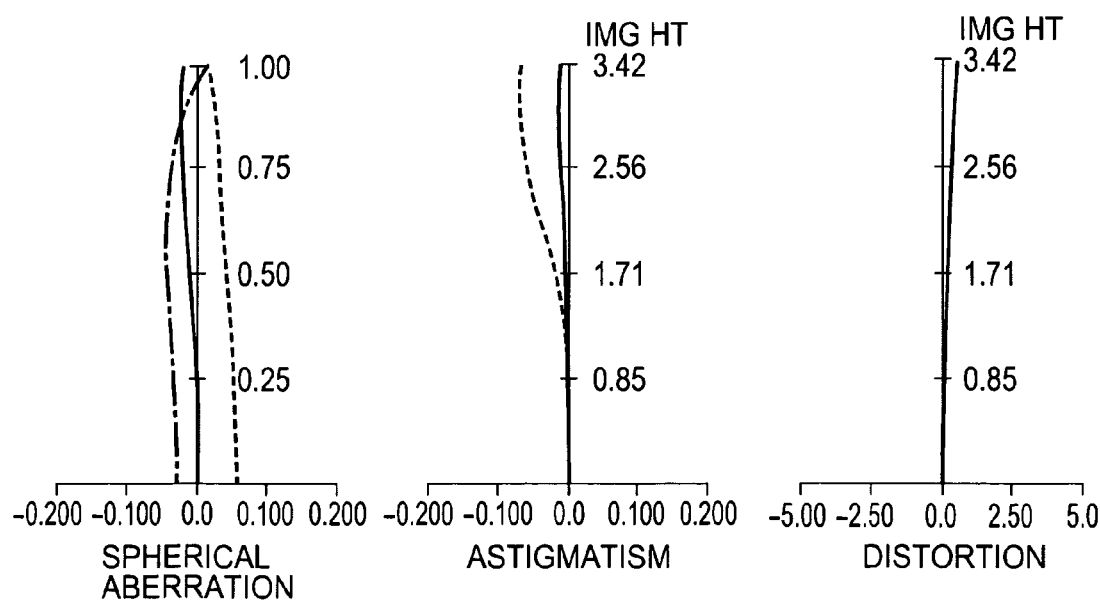
FIG. 3 is diagrams showing spherical aberrations, astigmatisms and distortions at an intermediate focus distance between a maximum wide angle state and a maximum telephoto state.
Figure 4:
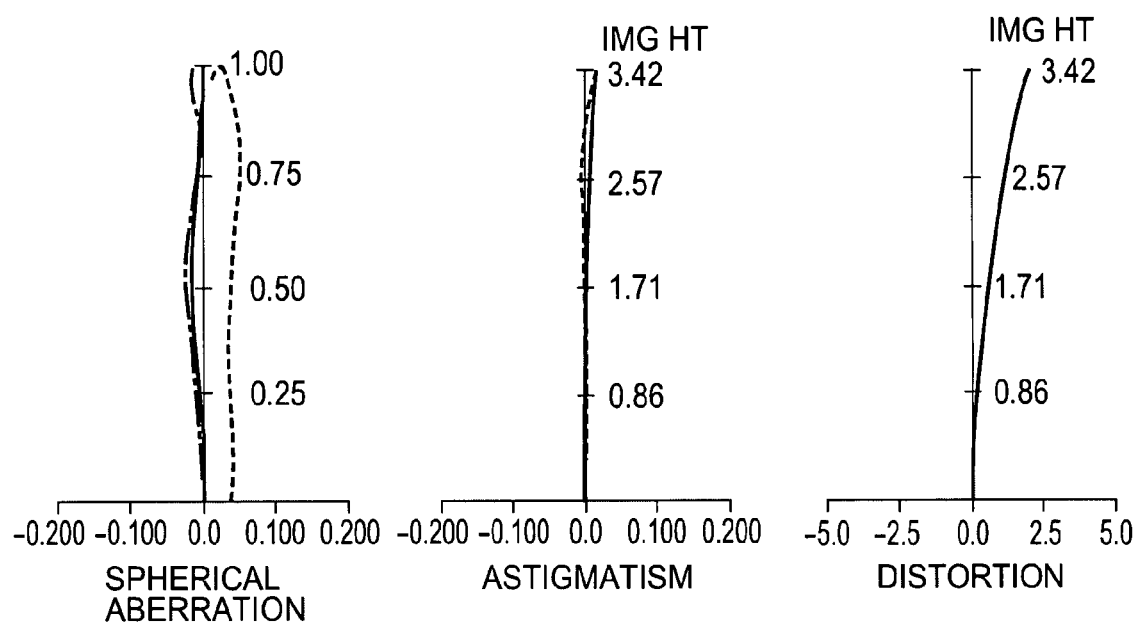
FIG. 4 is diagrams showing spherical aberrations, astigmatisms and distortions in a maximum telephoto state.

FIGS. 2–4 show each aberration diagram of the numerical example 1. FIG. 2 shows spherical aberrations, astigmatisms and distortions in the maximum wide angle state; FIG. 3 shows spherical aberrations, astigmatisms and distortions at an intermediate focus position between the maximum wide angle state and the maximum telephoto state; and FIG. 4 shows spherical aberrations, astigmatisms and distortions in the maximum telephoto state. In the diagrams showing the spherical aberrations, ratios of the spherical aberrations to fastest F numbers are plotted on the ordinate axes, and defocuses are plotted on the abscissa axes. Solid lines indicate the spherical aberrations on d lines; broken lines indicate the spherical aberrations on C lines; and chain lines indicate the spherical aberrations on g lines. In the diagrams showing the astigmatisms, image heights are plotted on the ordinate axes, and focuses are plotted on the abscissa axes. Solid lines indicate sagittal image surfaces, and broken lines indicate meridional image surfaces. In the diagrams showing the distortions, image heights are plotted on the ordinate axes, and percentages are plotted on the abscissa axes.

Figure 5:
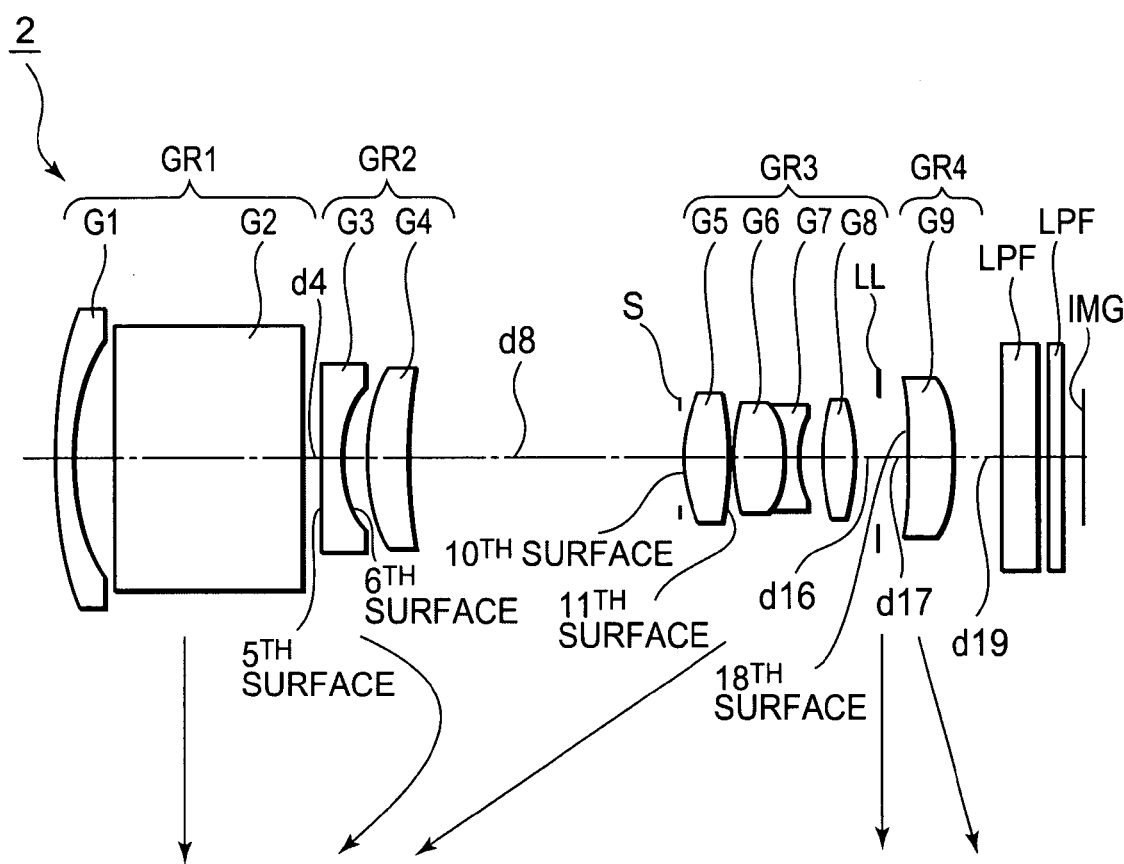
FIG. 5 is a diagram showing a lens configuration of a zoom lens of a second embodiment of the present invention.

FIG. 5 shows a zoom lens 2 of a second embodiment of the present invention.

The zoom lens 2 is composed of a first lens group GR1 having a negative refractive power, a second lens group GR2 having a negative refractive power, a third lens group GR3 having a positive refractive power, and a fourth lens group GR4 having a light adjustment member LL and a positive refractive power, each arranged in this order from the object side. The first lens group GR1 is composed of a negative lens G1 and a rectangular prism G2 for bending an optical axis by 90°. The second lens group GR2 is composed of a negative lens G3 having aspherical surfaces on both the surfaces thereof, and a positive lens G4. The third lens group GR3 is composed of a positive lens G5 having aspherical surfaces on both the surface thereof, a cemented lens of a positive lens G6 and a negative lens G7, and a positive lens G8. The fourth lens group GR4 is composed of a positive lens G9 having an aspherical surface on the object side. When the lens position state changes from the maximum wide angle state to the maximum telephoto state, the first lens group GR1 and the light amount adjustment member LL are fixed in the optical axis direction, and the second lens group GR2, the third lens group GR3 and the fourth lens group GR4 move on the optical axis in the directions shown by arrows in FIG. 5. Moreover, the image can be shifted in a direction perpendicular to the optical axis by moving either of the second lens group GR2 and the third lens group GR3 in the direction perpendicular to the optical axis.

In addition, the aperture diaphragm S is arranged close to the object side of the third lens group GR3, and moves together with the third lens group GR3. The low-pass filter LPF is inserted between the fourth lens group GR4 and the imaging surface IMG.

Table 4 shows values of each element of a numerical example 2 in which specific numerical values are applied to the second embodiment described above.

TABLE 4

| SURFACE No. | R | d | nd | vd |
|---|---|---|---|---|
| 1 | 27.266 | 0.840 | 1.88300 | 40.805 |
| 2 | 10.903 | 3.020 | | |
| 3 | INFINITY | 11.400 | 1.84666 | 23.785 |
| 4 | INFINITY | d4 | | |
| 5 | 175.776(ASP) | 1.180 | 1.73077 | 40.501 |
| 6 | 5.866(ASP) | 1.830 | | |

TABLE 4-continued

| SURFACE No. | R | d | nd | vd |
|---|---|---|---|---|
| 7 | 13.049 | 2.800 | 1.84666 | 23.785 |
| 8 | −633.446 | d8 | | |
| 9 | DIAPHRAGM | 0.130 | | |
| 10 | 7.584(ASP) | 2.572 | 1.58313 | 59.461 |
| 11 | −23.825(ASP) | 0.500 | | |
| 12 | 16.929 | 3.160 | 1.48749 | 70.441 |
| 13 | −6.822 | 0.770 | 1.64769 | 33.841 |
| 14 | 5.810 | 1.500 | | |
| 15 | 16.837 | 1.835 | 1.48749 | 70.441 |
| 16 | −16.182 | d16 | | |
| 17 | LIGHT AMOUNT ADJUSTMENT MEMBER | d17 | | |
| 18 | −37.112(ASP) | 2.748 | 1.77377 | 47.200 |
| 19 | −14.731 | d19 | | |
| 20 | INFINITY | 1.920 | 1.51680 | 64.198 |
| 21 | INFINITY | 0.600 | | |
| 22 | INFINITY | 0.750 | 1.51680 | 64.198 |
| 23 | INFINITY | | | |

A surface interval between the first lens group GR1 and the second lens group GR2 is d4, between the second lens group GR2 and the aperture diaphragm S is d8, between the third lens group GR3 and the light amount adjustment member LL is d16, between the light amount adjustment member LL and the fourth lens group GR4 is d17, and between the fourth lens group GR4 and the low-pass filter LPF is d19. As a change of the lens position state from the maximum wide angle state to the maximum telephoto state, the surface intervals d4, d8, d16, d17 and d19 change. Accordingly, Table 5 shows each value of each surface interval in the numerical example 2 in the maximum wide angle state, at the intermediate focus distance between the maximum wide angle state and the maximum telephoto state, and in the maximum telephoto state together with the F number FNo., the focus distance f and the half angle of view ω.

TABLE 5

FNo. = 2.86~4.13~5.12
f = 4.74~9.01~13.76
ω = 38.59~21.81~14.40
d4 = 1.100~4.649~1.100
d8 = 15.862~4.554~1.717
d16 = 1.930~9.688~16.075
d17 = 1.300~3.132~3.244
d19 = 3.032~1.200~1.088

Each lens surface of a 5th surface, a 6th surface, a 10th surface, an 11th surface and an 18th surface is composed of an aspherical surface r5, r6, r10, r11 and r18, respectively. The aspherical coefficient of each of the surfaces in the numerical example 2 is as shown in Table 6.

TABLE 6

| SURFACE No. | ϵ | $A^4$ | $A^6$ | $A^8$ | $A^{10}$ |
|---|---|---|---|---|---|
| 5 | 1 | −0.160035E−03 | 0.151129E−04 | −0.559018E−06 | 0.808977E−08 |
| 6 | 1 | −0.918509E−03 | 0.736739E−05 | −0.706292E−06 | −0.143337E−09 |
| 10 | 1 | −0.415776E−03 | 0.181284E−05 | −0.925530E−06 | −0.117488E−07 |
| 11 | 1 | −0.224979E−03 | 0.934059E−05 | −0.183327E−05 | 0.273976E−07 |
| 18 | 1 | −0.231774E−03 | −0.523621E−05 | 0.355470E−06 | −0.528093E−08 |

Figure 6:
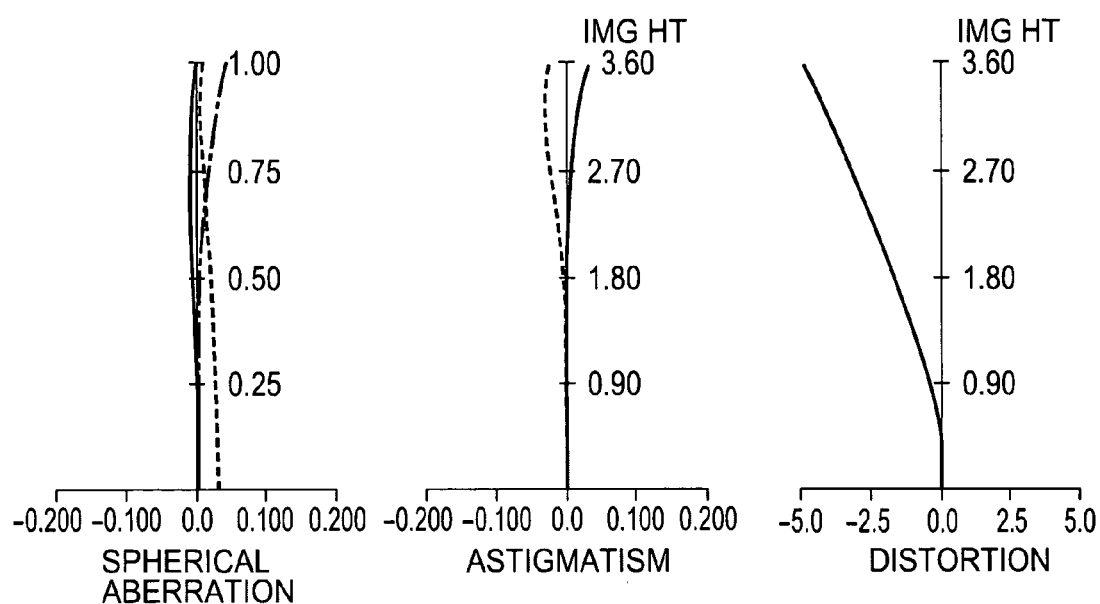
FIG. 6 is diagrams showing various aberrations of a numerical example 2 obtained by applying specific numerical values to the zoom lens of the second embodiment of the present invention together with FIGS. 7 and 8.
Figure 7:
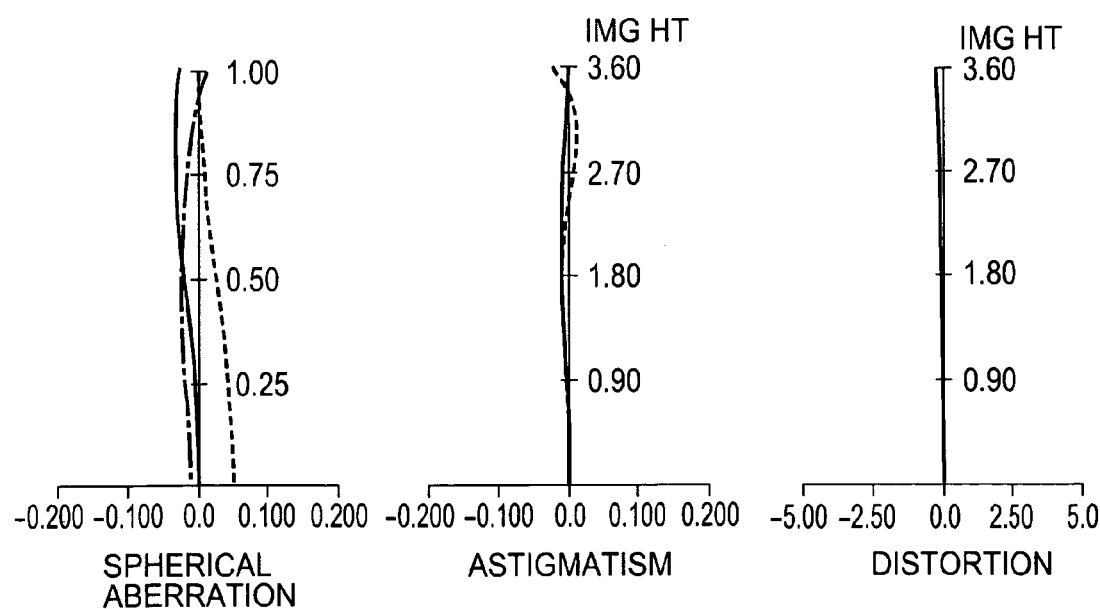
FIG. 7 is diagrams showing spherical aberrations, astigmatisms and distortions at an intermediate focus distance between a maximum wide angle state and a maximum telephoto state.
Figure 8:
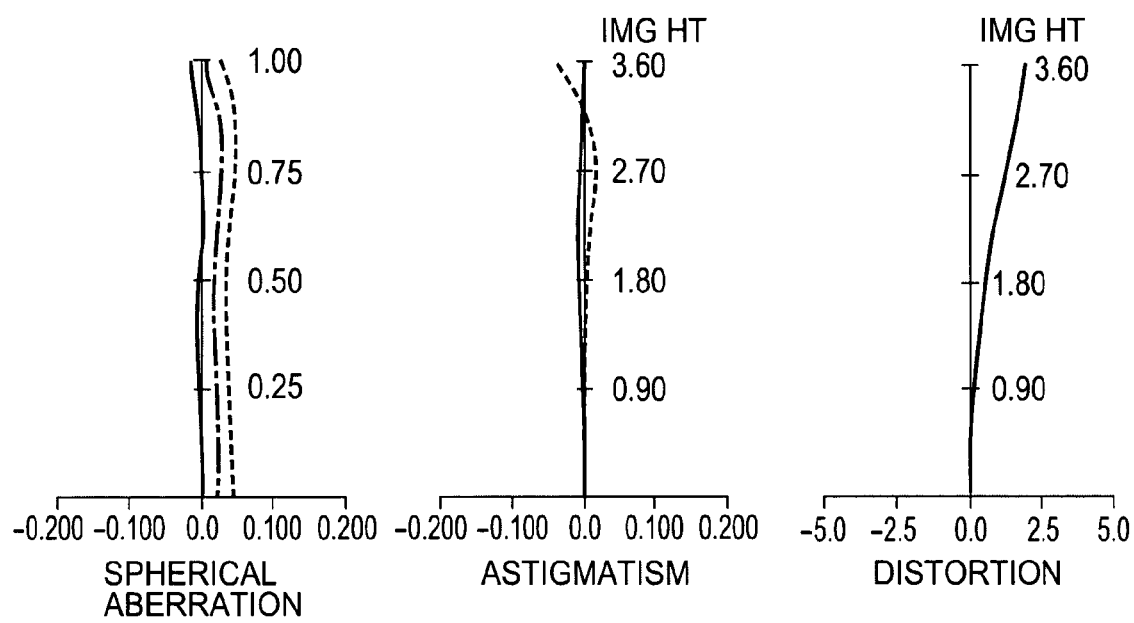
FIG. 8 is diagrams showing spherical aberrations, astigmatisms and distortions in a maximum telephoto state.

FIGS. 6–8 show each aberration diagram of the numerical example 2. FIG. 6 shows the spherical aberrations, the astigmatisms and the distortions in the maximum wide angle state; FIG. 7 shows the spherical aberrations, the astigmatisms and the distortions at the intermediate focus position between the maximum wide angle state and the maximum telephoto state; and FIG. 8 shows the spherical aberrations, the astigmatisms and the distortions in the maximum telephoto state. In the diagrams showing the spherical aberrations, the ratios of the spherical aberrations to fastest F numbers are plotted on the ordinate axes, and the defocuses are plotted on the abscissa axes. Solid lines indicate the spherical aberrations on the d lines; broken lines indicate the spherical aberrations on the C lines; and chain lines indicate the spherical aberrations on the g lines. In the diagrams showing the astigmatisms, the image heights are plotted on the ordinate axes, and the focuses are plotted on the abscissa axes. Solid lines indicate the sagittal image surfaces, and broken lines indicate the meridional image surfaces. In the diagrams showing the distortions, the image heights are plotted on the ordinate axes, and the percentages are plotted on the abscissa axes.

Figure 9:
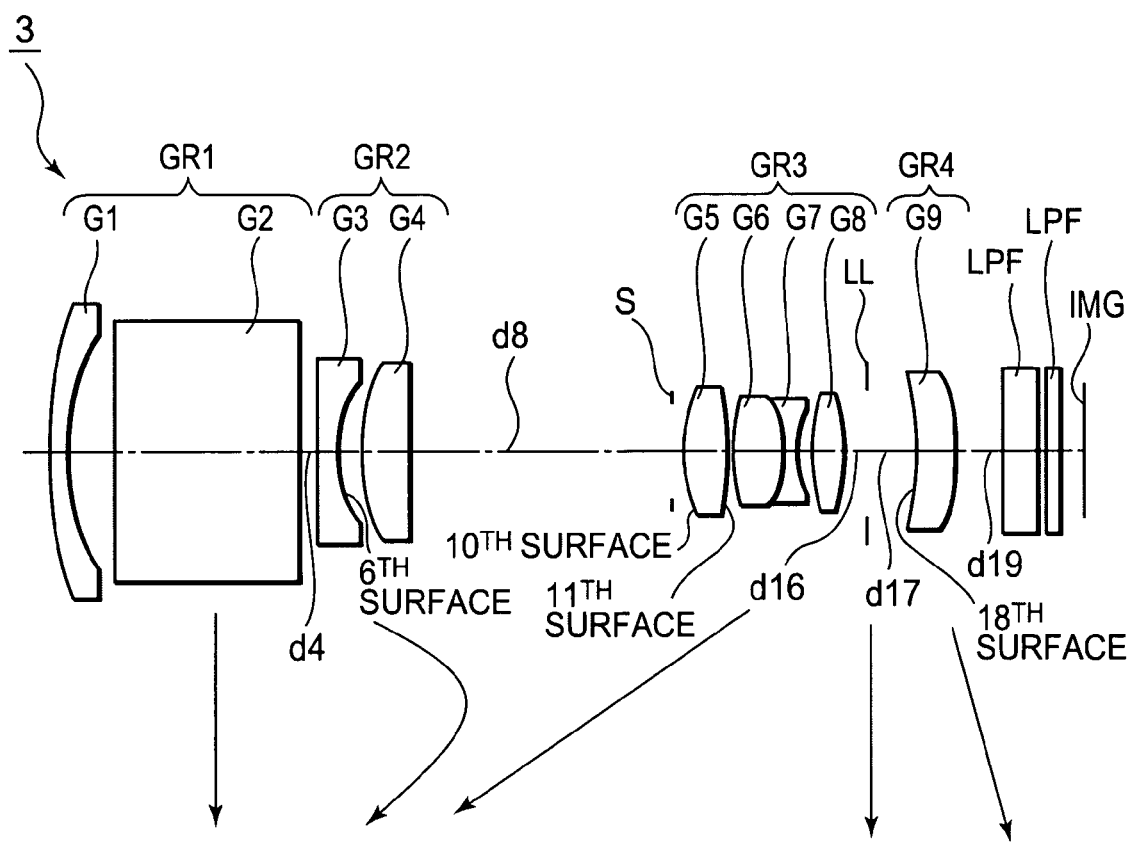
FIG. 9 is a diagram showing a lens configuration of a zoom lens of a third embodiment the present invention.

FIG. 9 shows a zoom lens 3 of a third embodiment of the present invention.

The zoom lens 3 is composed of a first lens group GR1 having a negative refractive power, a second lens group GR2 having a negative refractive power, a third lens group GR3 having a positive refractive power, and a fourth lens group GR4 having a light adjustment member LL and a positive refractive power, each arranged in this order from the object side. The first lens group GR1 is composed of a negative lens G1 and a rectangular prism G2 for bending an optical axis by 90°. The second lens group GR2 is composed of a negative lens G3 having an aspherical surface on the image side, and a positive lens G4. The third lens group GR3 is composed of a positive lens G5 having aspherical surfaces on both the surface thereof, a cemented lens of a positive lens G6 and a negative lens G7, and a positive lens G8. The fourth lens group GR4 is composed of a positive lens G9 having an aspherical surface on the object side. When the lens position state changes from the maximum wide angle state to the maximum telephoto state, the first lens group GR1 and the light amount adjustment member LL are fixed in the optical axis direction, and the second lens group GR2, the third lens group GR3 and the fourth lens group GR4 move on the optical axis in the directions shown by arrows in FIG. 9. Moreover, the image can be shifted in a direction perpendicular to the optical axis by moving either of the second lens group GR2 and the third lens group GR3 into the direction perpendicular to the optical axis.

In addition, the aperture diaphragm S is arranged close to the object side of the third lens group GR3, and moves together with the third lens group GR3. The low-pass filter LPF is inserted between the fourth lens group GR4 and the imaging surface IMG.

Table 7 shows values of each element of a numerical example 3 in which specific numerical values are applied to the third embodiment described above.

TABLE 7

| SURFACE No. | R | d | nd | vd |
|---|---|---|---|---|
| 1 | 22.595 | 0.650 | 1.88300 | 40.805 |
| 2 | 8.409 | 2.300 | | |
| 3 | INFINITY | 8.900 | 1.84666 | 23.785 |
| 4 | INFINITY | d4 | | |
| 5 | 81.924 | 0.900 | 1.73077 | 40.501 |
| 6 | 4.612(ASP) | 1.410 | | |
| 7 | 9.874 | 2.100 | 1.84666 | 23.785 |
| 8 | 882.961 | d8 | | |
| 9 | DIAPHRAGM | 0.100 | | |
| 10 | 5.520(ASP) | 2.200 | 1.58313 | 59.461 |
| 11 | −12.931(ASP) | 0.320 | | |
| 12 | 24.065 | 2.220 | 1.48749 | 70.441 |
| 13 | −5.047 | 0.600 | 1.64769 | 33.841 |
| 14 | 4.327 | 1.145 | | |
| 15 | 12.000 | 1.411 | 1.48749 | 70.441 |
| 16 | −14.666 | d16 | | |
| 17 | LIGHT AMOUNT ADJUSTMENT MEMBER | d17 | | |
| 18 | −18.906(ASP) | 2.000 | 1.77377 | 47.200 |
| 19 | −9.058 | d19 | | |
| 20 | INFINITY | 1.530 | 1.51680 | 64.198 |
| 21 | INFINITY | 0.500 | | |
| 22 | INFINITY | 0.600 | 1.51680 | 64.198 |
| 23 | INFINITY | | | |

A surface interval between the first lens group GR1 and the second lens group GR2 is d4, between the second lens group GR2 and the aperture diaphragm S is d8, between the third lens group GR3 and the light amount adjustment member LL is d16, between the light a adjustment member LL and the fourth lens group GR4 is d17, and between the fourth lens group GR4 and the low-pass filter LPF is d19. As a change of the lens position state from the maximum wide angle state to the maximum telephoto state, these surface intervals d4, d8, d16, d17 and d19 change. Accordingly, Table 8 shows each value of each surface interval in the numerical example 3 in the maximum wide angle state, at the intermediate focus distance between the maximum wide angle state and the maximum telephoto state, and in the maximum telephoto state together with the F number FNo., the focus distance f and the half angle of view ω.

TABLE 8

FNo. = 2.86~4.15~5.17
f = 3.69~7.02~10.70
ω = 38.56~21.79~14.41
d4 = 0.880~3.827~0.880
d8 = 12.829~3.737~1.724
d16 = 1.405~7.550~12.510
d17 = 1.519~2.630~2.830
d19 = 2.151~1.040~0.840

Each lens surface of a 6th surface, a 10th surface, an 11th surface and an 18th surface is composed of the aspherical surface r6, r10, r11 and r18, respectively. The aspherical coefficient of each of the surfaces in the numerical example 3 is as shown in Table 9.

TABLE 9

| SURFACE No. | $\epsilon$ | $A^4$ | $A^6$ | $A^8$ | $A^{10}$ |
|---|---|---|---|---|---|
| 6 | 1 | −0.154426E−02 | −0.967007E−05 | −0.441264E−05 | 0.125661E−06 |
| 10 | 1 | −0.111861E−02 | −0.460219E−04 | 0.192625E−05 | −0.101161E−05 |
| 11 | 1 | −0.540695E−03 | 0.292235E−05 | −0.817608E−05 | −0.224752E−06 |
| 18 | 1 | −0.479030E−03 | −0.679555E−04 | 0.872286E−05 | −0.361221E−06 |

Figure 10:
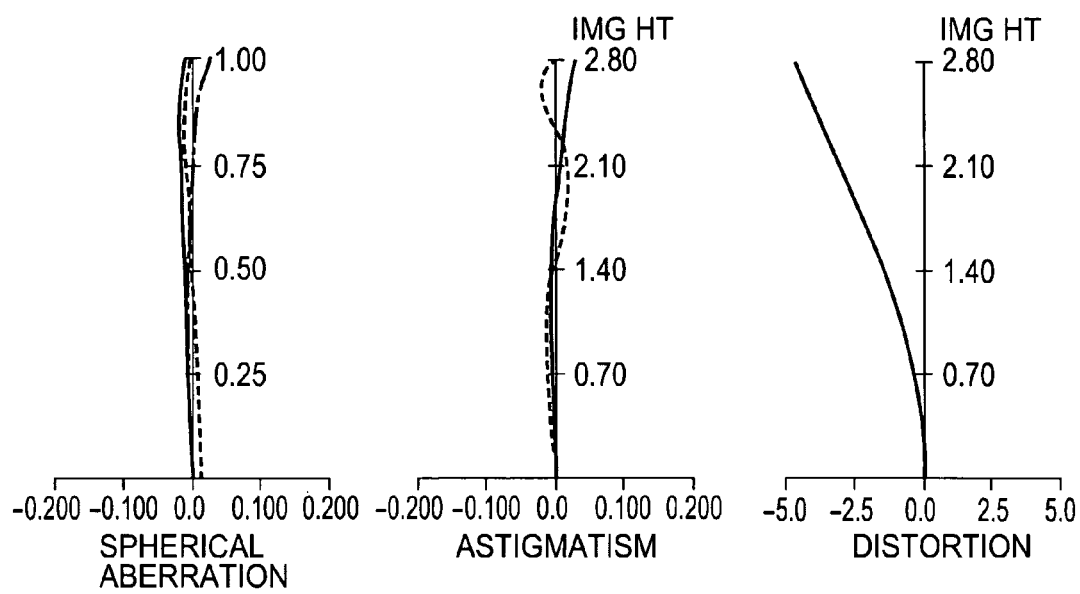
FIG. 10 is diagrams showing various aberrations of a numerical example 3 obtained by applying specific numerical values to the zoom lens of the third embodiment of the present invention together with FIGS. 11 and 12.
Figure 11:
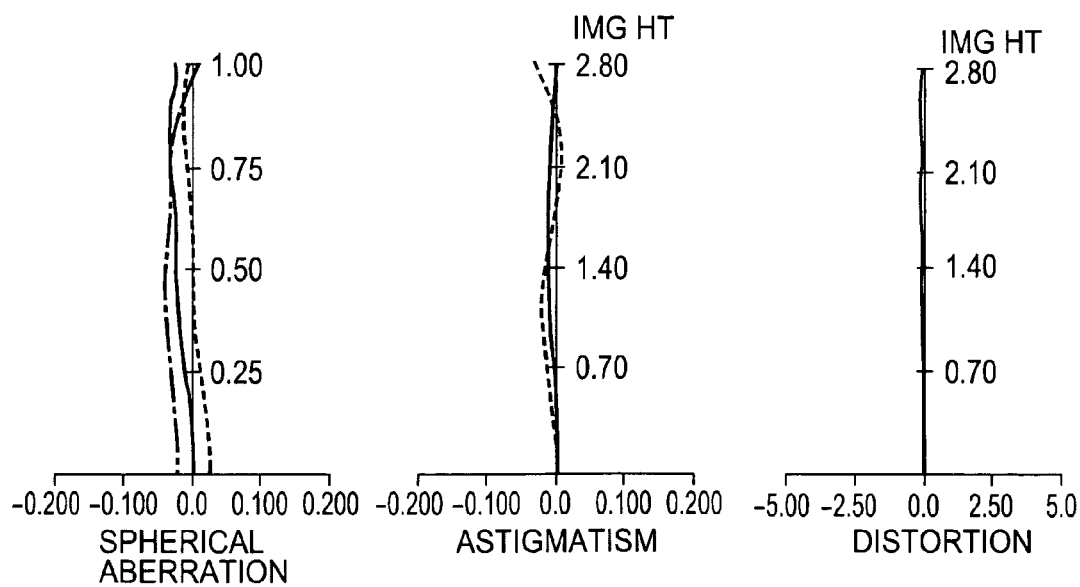
FIG. 11 shows diagrams showing spherical aberrations, astigmatisms and distortions at an intermediate focus distance between a maximum wide angle state and a maximum telephoto state.
Figure 12:
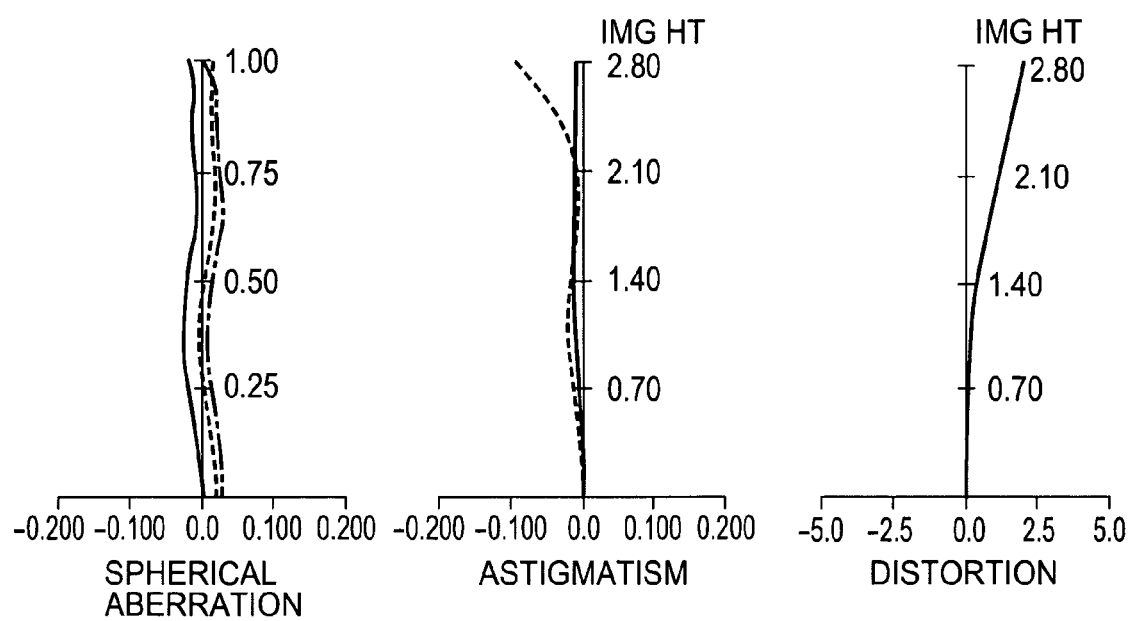
FIG. 12 is diagrams showing spherical aberrations, astigmatisms and distortions in a maximum telephoto state.

FIGS. 10–12 show each aberration diagram of the numerical example 3. FIG. 10 shows the spherical aberrations, the astigmatisms and the distortions in the maximum wide angle state; FIG. 11 shows the spherical aberrations, the astigmatisms and the distortions at the intermediate focus position between the maximum wide angle state and the maximum telephoto state; and FIG. 12 shows the spherical aberrations, the astigmatisms and the distortions in the maximum telephoto state. In the diagrams showing the spherical aberrations, the ratios of the spherical aberrations to fastest F numbers are plotted on the ordinate axes, and the defocuses are plotted on the abscissa axes. Solid lines indicate the spherical aberrations on the d lines; broken lines indicate the spherical aberrations on the C lines; and chain lines indicate the spherical aberrations on the g lines. In the diagrams showing the astigmatisms, the image heights are plotted on the ordinate axes, and the focuses are plotted on the abscissa axes. Solid lines indicate the sagittal image surfaces, and broken lines indicate the meridional image surfaces. In the diagrams showing the distortions, the image heights are plotted on the ordinate axes, and the percentages are plotted on the abscissa axes.

Figure 13:
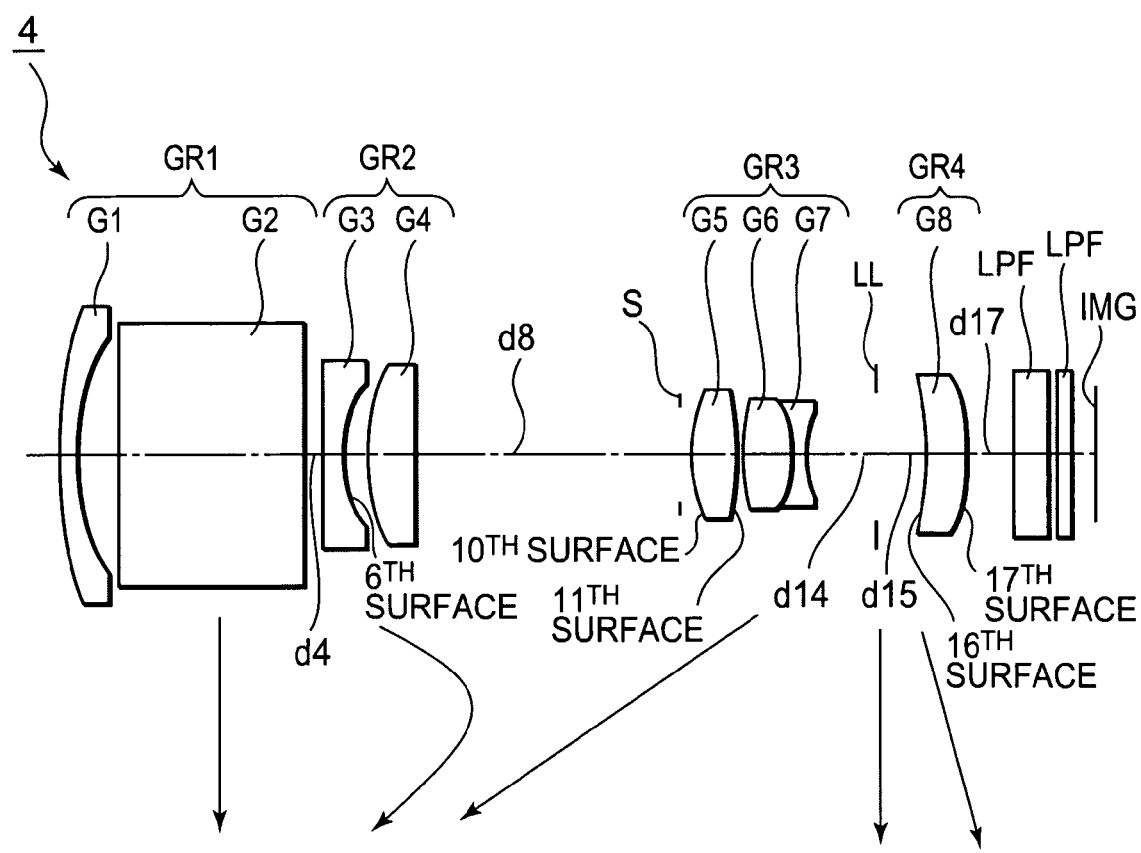
FIG. 13 is a diagram showing a lens configuration of a zoom lens of a fourth embodiment of the present invention.

FIG. 13 shows a zoom lens 4 of a fourth embodiment of the present invention.

The zoom lens 4 is composed of a first lens group GR1 having a negative refractive power, a second lens group GR2 having a negative refractive power, a third lens group GR3 having a positive refractive power, and a fourth lens group GR4 having a light adjustment member LL and a positive refractive power, each arranged in this order from an object side. The first lens group GR1 is composed of a negative lens G1 and a rectangular prism G2 for bending the optical axis by 90°. The second lens group GR2 is composed of a negative lens G3 having a aspherical surface on the image side, and a positive lens G4. The third lens group GR3 is composed of a positive lens G5 having aspherical surfaces on both the surfaces thereof, and a cemented lens of a positive lens G6 and a negative lens G7. The fourth lens group GR4 is composed of a plastic positive lens G8 having aspherical surfaces on both the surfaces thereof. When the lens position state changes from the maximum wide angle state to the maximum telephoto state, the first lens group GR1 and the light amount adjustment member LL are fixed in the optical axis direction, and the second lens group GR2, the third lens group GR3 and the fourth lens group GR4 move on the optical axis in the directions shown by arrows in FIG. 13. Moreover, the image can be shifted in a direction perpendicular to the optical axis by moving either of the second lens group GR2 and the third lens group GR3 in the direction perpendicular to the optical axis.

It is noted that the aperture diaphragm S is arranged close to the object side of the third lens group GR3, and moves together with the third lens group GR3. The low-pass filter LPF is inserted between the fourth lens group GR4 and the imaging surface IMG.

Table 10 shows values of each element of a numerical example 4 in which specific numerical values are applied to the fourth embodiment described above.

TABLE 10

| SURFACE No. | R | d | nd | vd |
|---|---|---|---|---|
| 1 | 24.631 | 0.700 | 1.88300 | 40.805 |
| 2 | 11.994 | 2.400 | | |
| 3 | INFINITY | 10.800 | 1.84666 | 23.785 |
| 4 | INFINITY | d4 | | |
| 5 | −92.234 | 1.200 | 1.80611 | 40.734 |
| 6 | 8.121(ASP) | 1.471 | | |
| 7 | 13.080 | 2.550 | 1.84666 | 23.785 |
| 8 | 264.232 | d8 | | |
| 9 | DIAPHRAGM | 1.071 | | |
| 10 | 80616(ASP) | 2.840 | 1.48749 | 70.441 |
| 11 | −11.801(ASP) | 0.340 | | |
| 12 | 15.092 | 2.907 | 1.72916 | 54.674 |
| 13 | −7.318 | 0.800 | 1.59270 | 35.446 |
| 14 | 4.864 | d14 | | |
| 15 | LIGHT AMOUNT ADJUSTMENT MEMBER | d15 | | |
| 16 | −31.547(ASP) | 2.100 | 1.52470 | 56.236 |
| 17 | −10.101(ASP) | d17 | | |
| 18 | INFINITY | 1.900 | 1.51680 | 64.198 |
| 19 | INFINITY | 0.600 | | |
| 20 | INFINITY | 0.700 | 1.51680 | 64.198 |
| 21 | INFINITY | | | |

A surface interval between the first lens group GR1 and the second lens group GR2 is d4, between the second lens group GR2 and the aperture diaphragm S is d8, between the third lens group GR3 and the light amount adjustment member LL is d14, between the light amount adjustment member LL and the fourth lens group GR4 is d15, and between the fourth lens group GR4 and the low-pass filter LPF is d17. As a change of the lens position state from the maximum wide angle state to the maximum telephoto state, these surface intervals d4, d8, d14, d15 and d17 change. Accordingly, Table 11 shows each value of each surface interval in the numerical example 4 in the maximum wide angle state, at the intermediate focus distance between the maximum wide angle state and the maximum telephoto state, and in the maximum telephoto state together with the F number FNo., the focus distance f and the half angle of view ω.

TABLE 11

FNo. = 2.86~4.15~5.21
f = 5.71~10.84~16.54
ω = 32.24~17.45~11.52

TABLE 11-continued d4 = 1.100~4.350~0.839
d8 = 15.058~4.456~1.651
d14 = 2.614~9.973~16.282
d15 = 3.236~4.582~4.629
d17 = 2.594~1.240~1.200

Each lens surface of a 6th surface, a 10th surface, an 11th surface, a 16th surface and a 17th surface is composed of an aspherical surface r6, r10, r11, r16 and r17, respectively. The aspherical coefficient of each of the surfaces in the numerical example 4 is as shown in Table 12.

TABLE 12

| SURFACE No. | $\epsilon$ | $A^4$ | $A^6$ | $A^8$ | $A^{10}$ |
|---|---|---|---|---|---|
| 6 | 1 | −0.236090E−03 | 0.195539E−05 | −0.240030E−06 | 0.568074E−08 |
| 10 | 1 | −0.810299E−03 | −0.309901E−06 | −0.164625E−05 | −0.132742E−08 |
| 11 | 1 | −0.150065E−03 | 0.743678E−05 | −0.226961E−05 | 0.404500E−07 |
| 16 | 1 | −0.209875E−03 | −0.202921E−04 | 0.765438E−06 | 0.226804E−07 |
| 17 | 1 | 0.271556E−03 | −0.317324E−04 | 0.132533E−05 | 0.000000E+00 |

Figure 14:
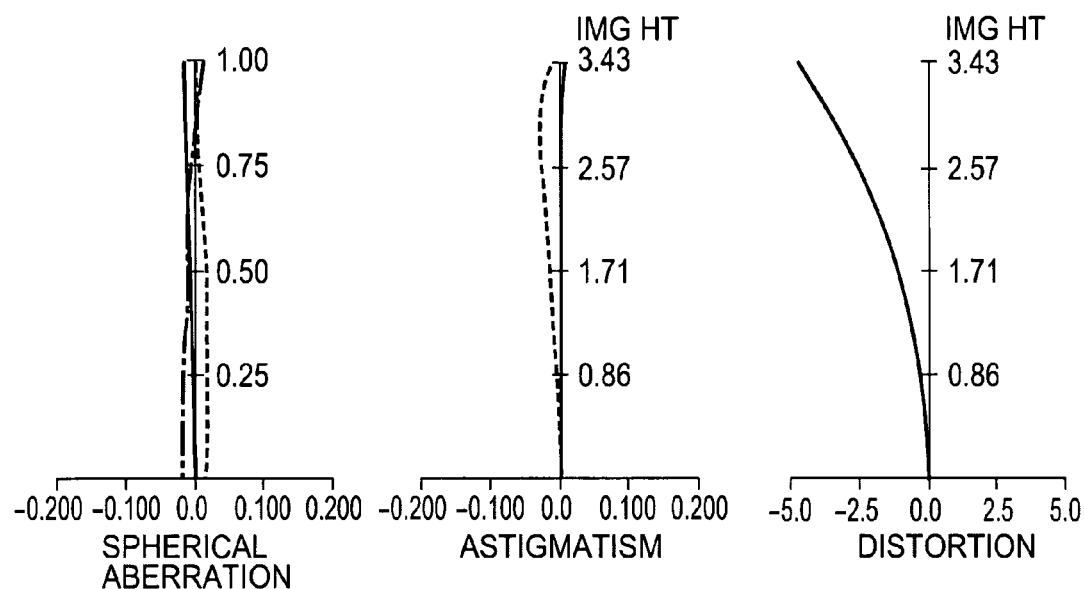
FIG. 14 is diagrams showing various aberrations of a numerical example 4 obtained by applying specific numerical values to the zoom lens of the fourth embodiment of the present invention together with FIGS. 15 and 16.
Figure 15:
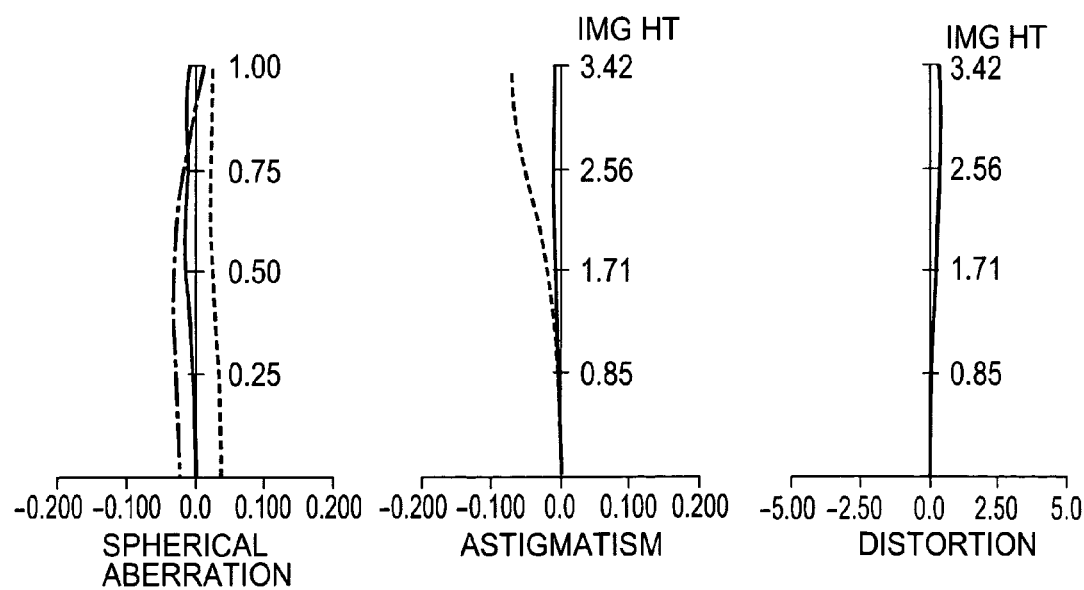
FIG. 15 shows diagrams showing spherical aberrations, astigmatisms and distortions at an intermediate focus distance between a maximum wide angle state and a maximum telephoto state.
Figure 16:
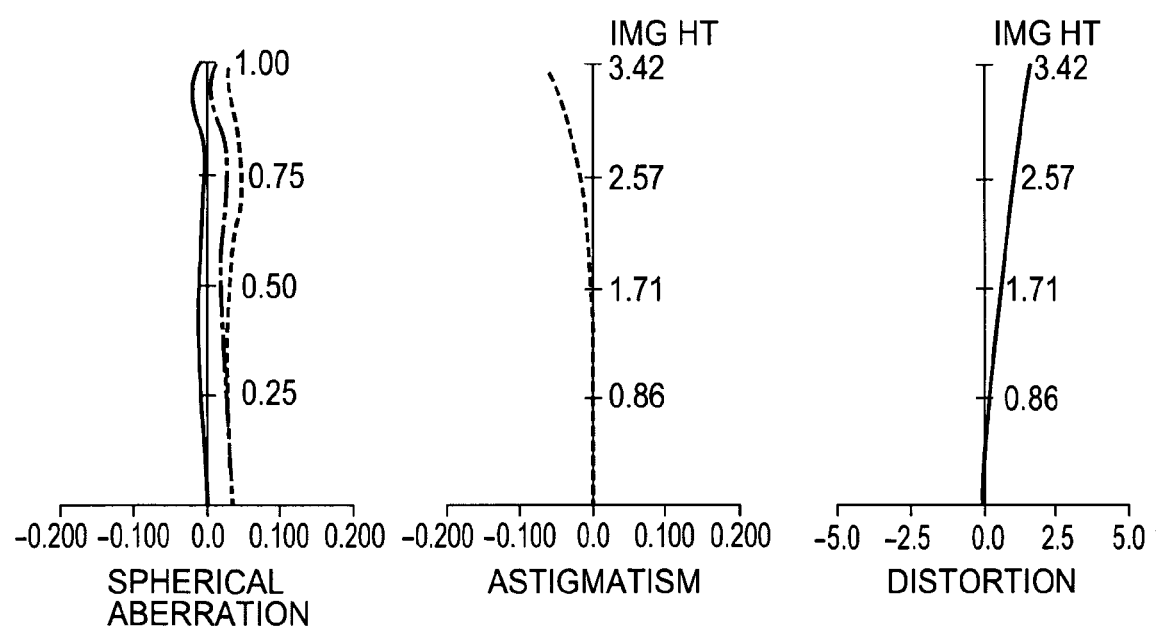
FIG. 16 is diagrams showing spherical aberrations, astigmatisms and distortions in a maximum telephoto state.

FIGS. 14–16 show each aberration diagram of the numerical example 4. FIG. 14 shows the spherical aberrations, the astigmatisms and the distortions in the maximum wide angle state; FIG. 15 shows the spherical aberrations, the astigmatisms and the distortions at the intermediate focus position between the maximum wide angle state and the maximum telephoto state; and FIG. 16 shows the spherical aberrations, the astigmatisms and the distortions in the maximum telephoto state. In the diagrams showing the spherical aberrations, the ratios of the spherical aberrations to fastest F numbers are plotted on the ordinate axes, and the defocuses are plotted on the abscissa axes. Solid lines indicate the spherical aberrations on the d lines; broken lines indicate the spherical aberrations on the C lines; and chain lines indicate the spherical aberrations on the g lines. In the diagrams showing the astigmatisms, the image heights are plotted on the ordinate axes, and the focuses are plotted on the abscissa axes. Solid lines indicate the sagittal image surfaces, and broken lines indicate the meridional image surfaces. In the diagrams showing the distortions, the image heights are plotted on the ordinate axes, and the percentages are plotted on the abscissa axes.

Figure 17:
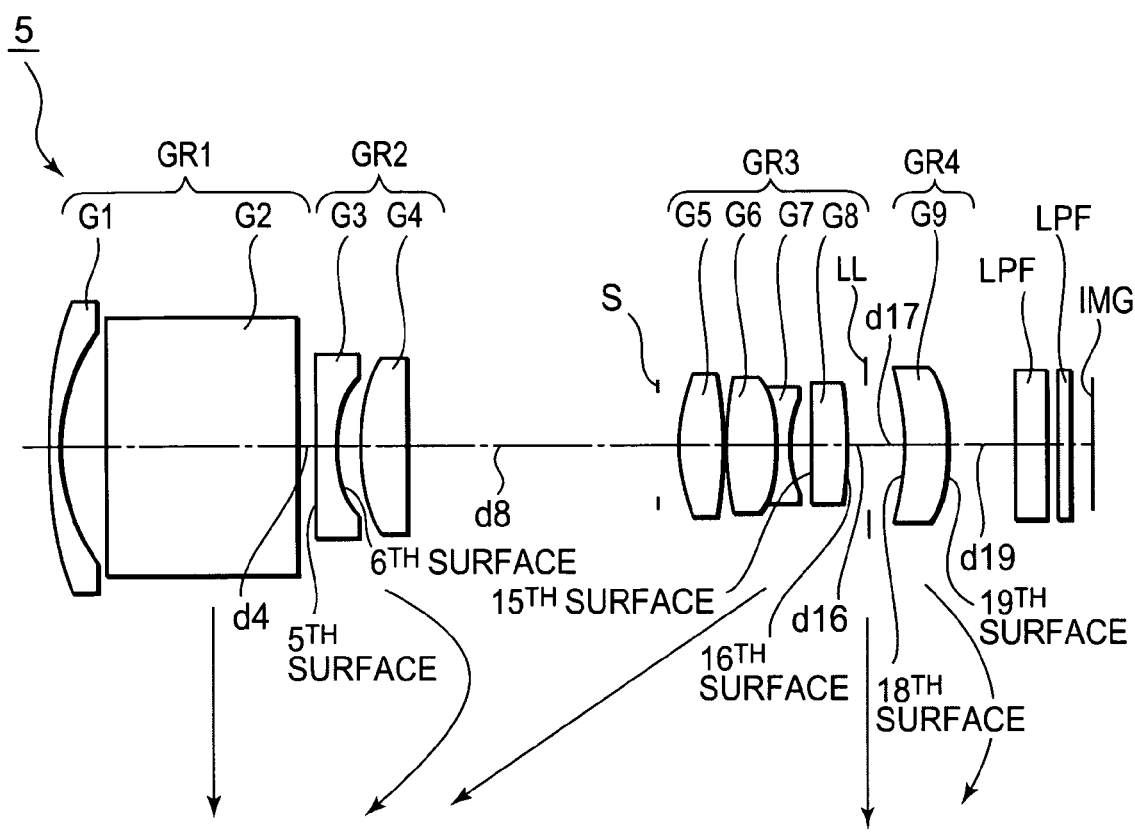
FIG. 17 is a diagram showing a lens configuration of a zoom lens of a fifth embodiment of the present invention.

FIG. 17 shows a zoom lens 5 of a fifth embodiment of the present invention.

The zoom lens 5 is composed of a first lens group GR1 having a negative refractive power, a second lens group GR2 having a negative refractive power, a third lens group GR3 having a positive refractive power, and a fourth lens group GR4 having a light amount adjustment member LL and a positive refractive power, each arranged in this order from the object side. The first lens group GR1 is composed of a negative lens G1 and a rectangular prism G2 for bending an optical axis by 90°. The second lens group GR2 is composed of a negative lens G3 having aspherical surfaces on both the surfaces thereof, and a positive lens G4. The third lens group GR3 is composed of a positive lens G5, a cemented lens of a positive lens G6 and a negative lens G7, and a plastic positive lens G8 having aspherical surfaces on both the surface thereof. The fourth lens group GR4 is composed of a plastic positive lens G9 having aspherical surfaces on both the surfaces thereof. When the lens position state changes from the maximum wide angle state to the maximum telephoto state, the first lens group GR1 and the light amount adjustment member LL are fixed in the optical axis direction, and the second lens group GR2, the third lens group GR3 and the fourth lens group GR4 move on the optical axis in the directions shown by arrows in FIG. 17. Moreover, the image can be shifted in a direction perpendicular to the optical axis by moving either of the second lens group GR2 and the third lens group GR3 in the direction perpendicular to the optical axis.

In addition, the aperture diaphragm S is arranged close to the object side of the third lens group GR3, and moves together with the third lens group GR3. The low-pass filter LPF is inserted between the fourth lens group GR4 and the imaging surface IMG.

Table 13 shows values of each element of a numerical example 5 in which specific numerical values are applied to the fifth embodiment described above.

TABLE 13

| SURFACE No. | R | d | nd | vd |
|---|---|---|---|---|
| 1 | 24.599 | 0.700 | 1.88300 | 40.805 |
| 2 | 11.190 | 2.400 | | |
| 3 | INFINITY | 10.450 | 1.84666 | 23.785 |
| 4 | INFINITY | d4 | | |
| 5 | −14.092(ASP) | 1.360 | 1.52470 | 56.236 |
| 6 | 12.422(ASP) | 1.400 | | |
| 7 | 10.136 | 1.880 | 1.84666 | 23.785 |
| 8 | 19.634 | d8 | | |
| 9 | DIAPHRAGM | 1.200 | | |
| 10 | 11.100 | 2.359 | 1.58913 | 61.253 |
| 11 | −99.119 | 0.100 | | |
| 12 | 7.694 | 2.947 | 1.65844 | 50.855 |
| 13 | −11.867 | 0.700 | 1.71736 | 29.501 |
| 14 | 7.244 | 1.300 | | |
| 15 | −43.564(ASP) | 1.700 | 1.52470 | 56.236 |
| 16 | −18.354(ASP) | d16 | | |
| 17 | LIGHT AMOUNT ADJUSTMENT MEMBER | d17 | | |
| 18 | −22.956(ASP) | 2.550 | 1.52470 | 56.236 |
| 19 | −10.989(ASP) | d19 | | |
| 20 | INFINITY | 1.870 | 1.51680 | 64.198 |
| 21 | INFINITY | 0.600 | | |
| 22 | INFINITY | 0.720 | 1.51680 | 64.198 |
| 23 | INFINITY | | | |

A surface interval between the first lens group GR1 and the second lens group GR2 is d4, between the second lens group GR2 and the aperture diaphragm S is d8, between the third lens group GR3 and the light amount adjustment member LL is d16, between the light amount adjustment member LL and the fourth lens group GR4 is d17, and between the fourth lens group GR4 and the low-pass filter LPF is d19. As a change of the lens position state from the maximum wide angle state to the maximum telephoto state, these surface intervals d4, d8, d16, d17 and d19 change. Accordingly, Table 14 shows each value of each surface interval in the numerical example 5 in the maximum wide angle state, at the intermediate focus distance between the maximum wide angle state and the maximum telephoto state, and in the maximum telephoto state together with the F number FNo., the focus distance f and the half angle of view ω.

TABLE 14

FNo. = 2.86~4.09~5.05
f = 5.70~10.83~16.53
ω = 32.26~17.56~11.55
d4 = 1.210~4.570~1.091
d8 = 14.658~4.102~1.239
d16 = 1.639~8.834~15.177
d17 = 1.600~4.137~3.761
d19 = 3.777~1.240~1.615

Each lens surface of a 5th surface, a 6th surface, a 15th surface, a 16th surface, an 18th surface and a 19th surface is composed of a aspherical surface r5, r6, r15, r16, r18 and r19, respectively. The aspherical coefficient of each of the surfaces in the numerical example 5 is as shown in Table 15.

TABLE 15

| SURFACE No. | ε | $A^4$ | $A^6$ | $A^8$ | $A^{10}$ |
|---|---|---|---|---|---|
| 5 | 1 | 0.189079E−02 | −0.703670E−04 | 0.186108E−05 | −0.226657E−07 |
| 6 | 1 | 0.193344E−02 | −0.666082E−04 | 0.187470E−05 | −0.262350E−07 |
| 15 | 1 | −0.574999E−03 | 0.386315E−04 | 0.964146E−06 | 0.000000E+00 |
| 16 | 1 | 0.195080E−03 | 0.465132E−04 | 0.148996E−05 | 0.000000E+00 |
| 18 | 1 | −0.212753E−03 | 0.457906E−04 | −0.413322E−06 | 0.000000E+00 |
| 19 | 1 | 0.133306E−03 | 0.284156E−04 | 0.230880E−06 | 0.000000E+00 |

Figure 18:
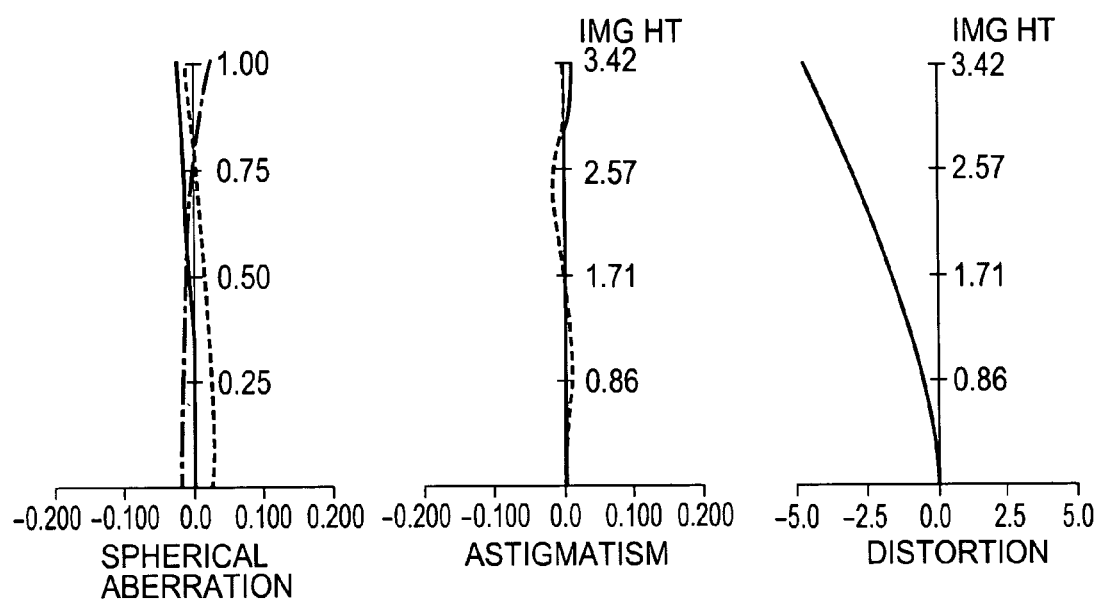
FIG. 18 is diagrams showing various aberrations of a numerical example 5 obtained by applying specific numerical values to the zoom lens of the fifth embodiment of the present invention together with FIGS. 19 and 20.
Figure 19:
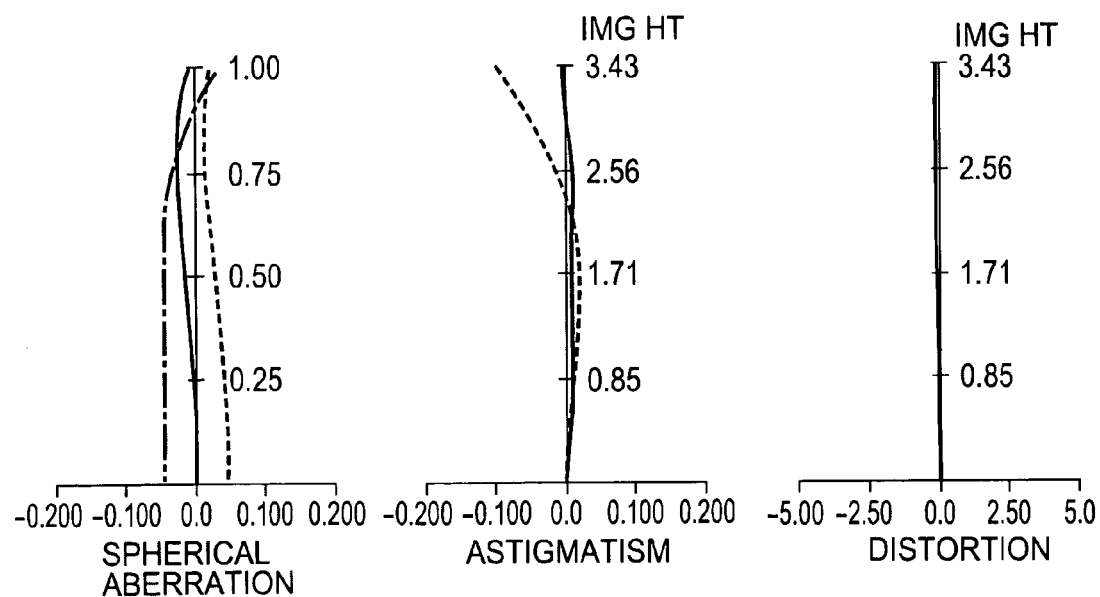
FIG. 19 shows diagrams showing spherical aberrations, astigmatisms and distortions at an intermediate focus distance between a maximum wide angle state and a maximum telephoto state.
Figure 20:
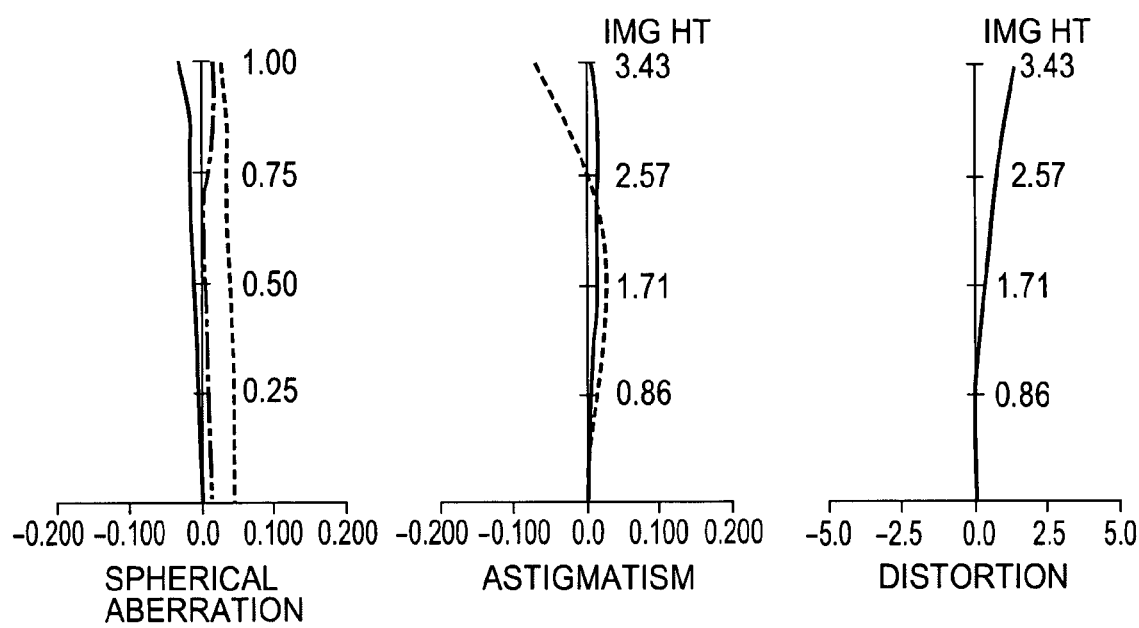
FIG. 20 is diagrams showing spherical aberrations, astigmatisms and distortions in a maximum telephoto state.

FIGS. 18–20 show each aberration diagram of the numerical example 5. FIG. 18 shows the spherical aberrations, the astigmatisms and the distortions in the maximum wide angle state; FIG. 19 shows the spherical aberrations, the astigmatisms and the distortions at the intermediate focus position between the maximum wide angle state and the maximum telephoto state; and FIG. 20 shows the spherical aberrations, the astigmatisms and the distortions in the maximum telephoto state. In the diagrams showing the spherical aberrations, the ratios of the spherical aberrations to fastest F numbers are plotted on the ordinate axes, and the defocuses are plotted on the abscissa axes. Solid lines indicate the spherical aberrations on the d lines; broken lines indicate the spherical aberrations on the C lines; and chain lines indicate the spherical aberrations on the g lines. In the diagrams showing the astigmatisms, the image heights are plotted on the ordinate axes, and the focuses are plotted on the abscissa axes. Solid lines indicate the sagittal image surfaces, and broken lines indicate the meridional image surfaces. In the diagrams showing the distortions, the image heights are plotted on the ordinate axes, and the percentages are plotted on the abscissa axes.

Figure 21:
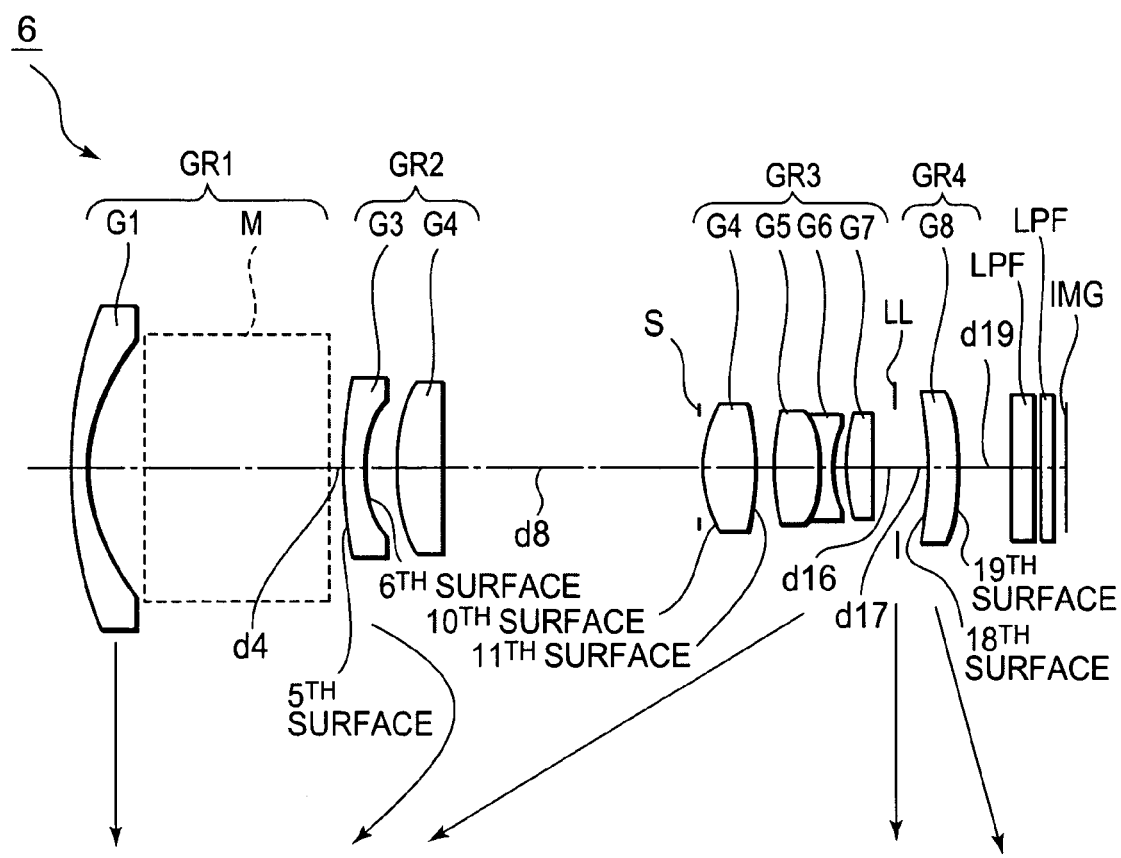
FIG. 21 is a diagram showing a lens configuration of a zoom lens of a sixth embodiment of the present invention.

FIG. 21 shows a zoom lens 6 of a sixth embodiment of the present invention.

The zoom lens 6 is composed of a first lens group GR1 having a negative refractive power, a second lens group GR2 having a negative refractive power, a third lens group GR3 having a positive refractive power, and a fourth lens group GR4 having a light amount adjustment member LL and a positive refractive power, each arranged in the order from the object side. The first lens group GR1 is composed of a negative lens G1 and a reflection mirror M for bending an optical axis by 90°. The second lens group GR2 is composed of a negative lens G2 having aspherical surfaces on both the surfaces thereof, and a positive lens G3. The third lens group GR3 is composed of a positive lens G4 having aspherical surfaces on both the surfaces thereof, a cemented lens of a positive lens G5 and a negative lens G6, and a positive lens G7. The fourth lens group GR4 is composed of a positive lens G8 having aspherical surfaces on both the surfaces thereof. When the lens position state changes from the maximum wide angle state to the maximum telephoto state, the first lens group GR1 and the light amount adjustment member LL are fixed in the optical axis direction, and the second lens group GR2, the third lens group GR3 and the fourth lens group GR4 move on the optical axis in the directions shown by arrows in FIG. 21. Moreover, the image can be shifted in the direction perpendicular to the optical axis by moving either of the second lens group GR2 and the third lens group GR3 in the direction perpendicular to the optical axis.

It is noted that the aperture diaphragm S is arranged close to the object side of the third lens group GR3, and moves together with the third lens group GR3. The low-pass filter LPF is inserted between the fourth lens group GR4 and the imaging surface IMG.

Table 16 shows values of each element of a numerical example 6 in which specific numerical values are applied to the sixth embodiment described above.

TABLE 16

| SURFACE No. | R | d | nd | vd |
|---|---|---|---|---|
| 1 | 29.542 | 0.850 | 1.88300 | 40.805 |
| 2 | 11.271 | 3.800 | | |
| 3 | INFINITY | 12.220 | | |
| 4 | INFINITY | d4 | | |
| 5 | 26.237(ASP) | 1.200 | 1.73077 | 40.501 |
| 6 | 5.980(ASP) | 2.320 | | |
| 7 | 12.918 | 2.740 | 1.84666 | 23.785 |
| 8 | 72.468 | d8 | | |
| 9 | DIAPHRAGM | 0.130 | | |
| 10 | 7.857 (ASP) | 3.420 | 1.58313 | 59.461 |
| 11 | −26.882 (ASP) | 1.200 | | |
| 12 | 11.250 | 2.938 | 1.48749 | 70.441 |
| 13 | −6.313 | 0.800 | 1.67270 | 32.171 |
| 14 | 5.285 | 0.913 | | |
| 15 | 16.649 | 1.525 | 1.48749 | 70.441 |
| 16 | −32.796 | d16 | | |
| 17 | LIGHT AMOUNT ADJUSTMENT MEMBER | d17 | | |
| 18 | −47.622 (ASP) | 1.900 | 1.77377 | 47.200 |
| 19 | −14.003 (ASP) | d19 | | |

TABLE 16-continued

| SURFACE No. | R | d | nd | vd |
|---|---|---|---|---|
| 20 | INFINITY | 1.200 | 1.51680 | 64.198 |
| 21 | INFINITY | 0.600 | | |
| 22 | INFINITY | 0.500 | 1.51680 | 64.198 |
| 23 | INFINITY | | | |

A surface interval between the first lens group GR1 and the second lens group GR2 is d4, between the second lens group GR2 and the aperture diaphragm S is d8, between the third lens group GR3 and the light amount adjustment member LL is d16, between the light amount adjustment member LL and the fourth lens group GR4 is d17, and between the fourth lens group GR4 and the low-pass filter LPF is d19. As a change of the lens position state from the maximum wide angle state to the maximum telephoto state, these surface intervals d4, d8, d16, d17 and d19 change. Accordingly, Table 17 shows each value of each surface interval in the numerical example 6 in the maximum wide angle state, at the intermediate focus distance between the maximum wide angle state and the maximum telephoto state, and in the maximum telephoto state together with the F number FNo., the focus distance f and the half angle of view ω.

TABLE 17

FNo. = 2.87~4.34~5.53
f = 4.85~9.22~14.07
ω = 38.29~21.60~14.30
d4 = 0.780~4.152~0.780
d8 = 16.722~5.627~2.323
d16 = 2.243~9.966~16.642
d17 = 1.349~3.787~3.969
d19 = 3.640~1.202~1.020

Each lens surface of a 5th surface, a 6th surface, a 10th surface, an 11th surface, an 18th surface and a 19th surface is composed of an aspherical surface r5, r6, r10, r11, r18 and r19, respectively. The aspherical coefficient of each of the surfaces in the numerical example 5 is as shown in Table 18.

TABLE 18

| SURFACE No. | ε | $A^4$ | $A^6$ | $A^8$ | $A^{10}$ |
|---|---|---|---|---|---|
| 5 | 1 | −0.199102E−04 | 0.120020E−04 | −0.410454E−06 | 0.617981E−08 |
| 6 | 1 | −0.633623E−03 | 0.841957E−05 | −0.719036E−06 | 0.414281E−08 |
| 10 | 1 | −0.387456E−03 | 0.265755E−05 | −0.858779E−06 | 0.215789E−09 |
| 11 | 1 | −0.309607E−03 | 0.973513E−05 | −0.183569E−05 | 0.398642E−07 |
| 18 | 1 | −0.338236E−03 | −0.260827E−04 | 0.334152E−05 | −0.388027E−07 |
| 19 | 1 | −0.183178E−03 | −0.185327E−05 | 0.954236E−06 | 0.000000E+00 |

Figure 22:
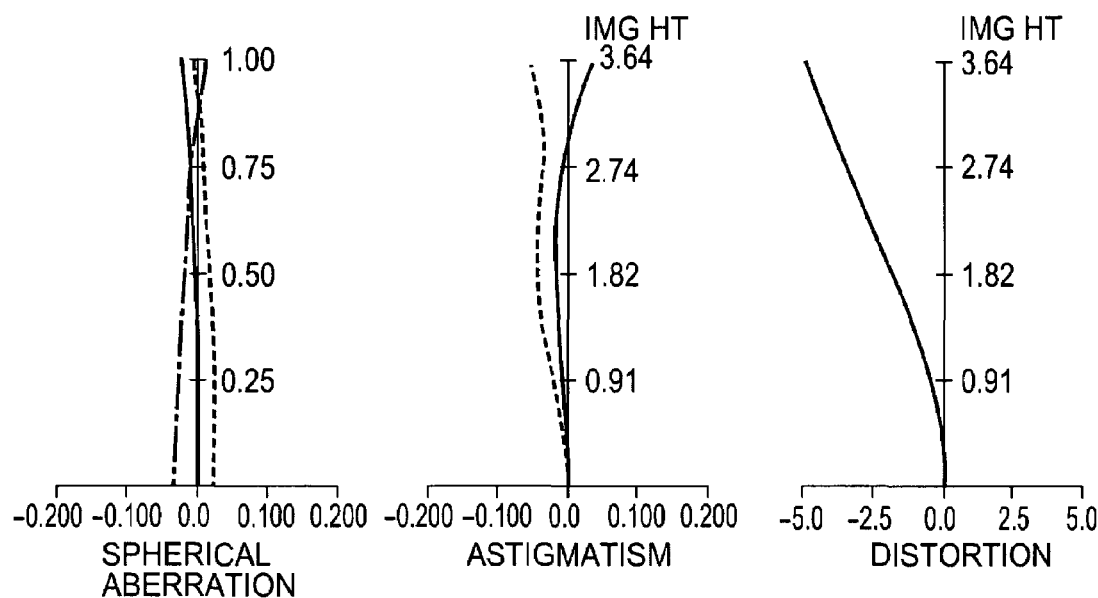
FIG. 22 is diagrams showing various aberrations of a numerical example 6 obtained by applying specific numerical values to the sixth embodiment of the zoom lens of the present invention together with FIGS. 23 and 24.
Figure 23:
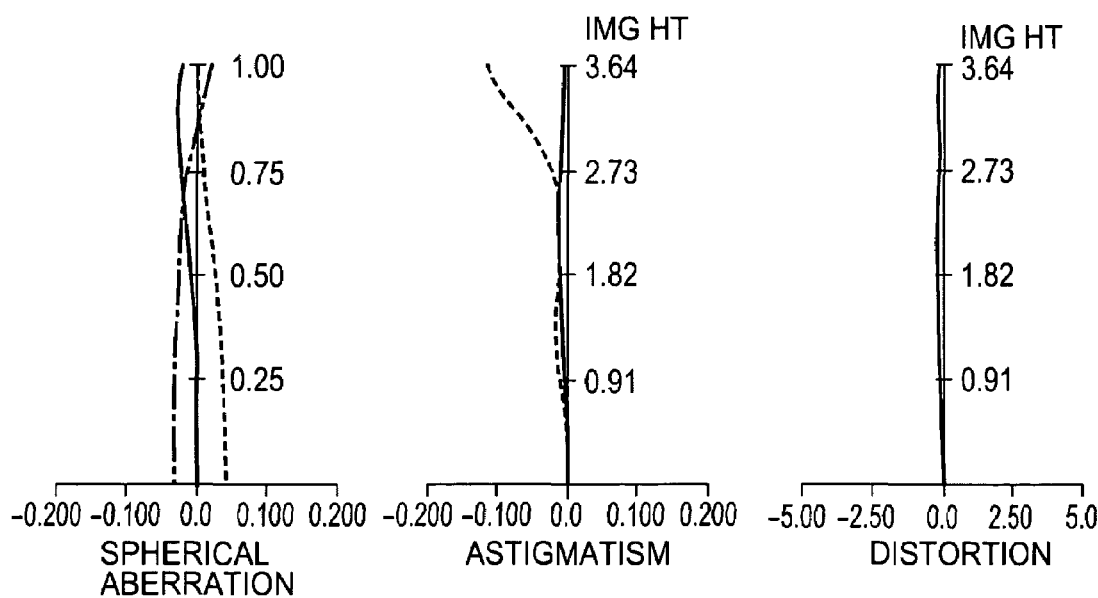
FIG. 23 shows diagrams showing spherical aberrations, astigmatisms and distortions at an intermediate focus distance between a maximum wide angle state and a maximum telephoto state.
Figure 24:
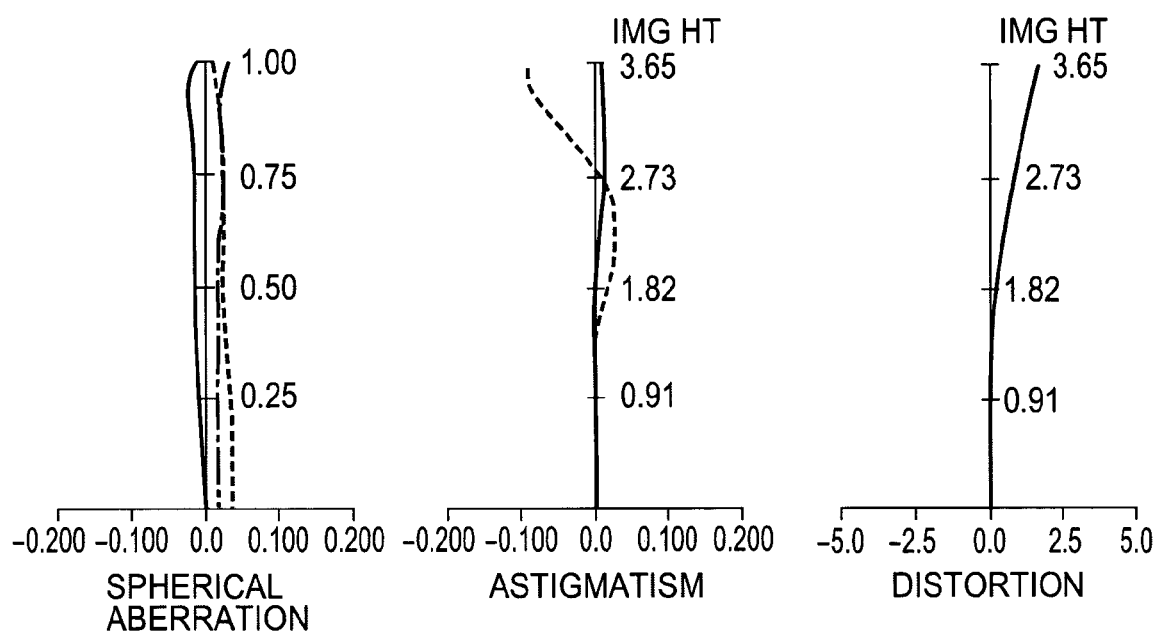
FIG. 24 is diagrams showing spherical aberrations, astigmatisms and distortions in a maximum telephoto state.

FIGS. 22–24 show each aberration diagram of the numerical example 6. FIG. 22 shows the spherical aberrations, the astigmatisms and the distortions in the maximum wide angle state; FIG. 23 shows the spherical aberrations, the astigmatisms and the distortions at the intermediate focus position between the maximum wide angle state and the maximum telephoto state; and FIG. 24 shows the spherical aberrations, the astigmatisms and the distortions in the maximum telephoto state. In the diagrams showing the spherical aberrations, the ratios of the spherical aberrations to fastest F numbers are plotted on the ordinate axes, and the defocuses are plotted on the abscissa axes. Solid lines indicate the spherical aberrations on the d lines; broken lines indicate the spherical aberrations on the C lines; and chain lines indicate the spherical aberrations on the g lines. In the diagrams showing the astigmatisms, the image heights are plotted on the ordinate axes, and the focuses are plotted on the abscissa axes. Solid lines indicate the sagittal image surfaces, and broken lines indicate the meridional image surfaces. In the diagrams showing the distortions, the image heights are plotted on the ordinate axes, and the percentages are plotted on the abscissa axes.

Table 19 shows the corresponding values of each of the conditional expressions (1), (2) and (3) in each of the numerical examples 1–6.

TABLE 19

| CONDITIONAL EXPRESSION | | EMB 1 | EMB 2 | EMB 3 | EMB 4 | EMB 5 | EMB 6 |
|---|---|---|---|---|---|---|---|
| $(1 - \beta_a) \times \beta_b$ | 2nd GROUP | 0.74 | 0.73 | 0.68 | 0.76 | 0.75 | 0.65 |
| | 3rd GROUP | 2.21 | 2.26 | 2.24 | 2.23 | 2.35 | 2.19 |
| |f1/f2| | | 0.938 | 0.822 | 0.716 | 0.997 | 0.799 | 0.582 |
| |f1/fw| | | 4.741 | 4.419 | 4.177 | 4.742 | 4.157 | 4.325 |

It is noted that the numerical values displayed on the right side of each of the displays of (2nd GROUP) and (3rd GROUP) with respect to the conditional expression (1) are numerical values in a case where the second lens group GR2 is used as the shift lens group (in a case of (2nd GROUP)), and numeral values in a case where the third lens group GR3 is used as the shift lens group (in a case of (3rd GROUP)), respectively.

From the Tables 1–17 and each of the aberration diagrams, it can be known that any of the numerical examples mentioned above satisfy the conditional expressions (1), (2) and (3), and that each aberration is corrected in a good balanced state.

An imaging apparatus according to an embodiment of the present invention is shown in FIG. 25.

An imaging apparatus 10 is equipped with a zoom lens 20, and includes an imaging device 30 converting an optical image formed by the zoom lens 20 into an electric signal. It is noted that, as the imaging device 30, an imaging device using a photoelectric conversion device such as a charge coupled device (CCD), a complementary metal-oxide semiconductor (CMOS) or the like can be applied. As the zoom lens 20, a zoom lens according to the embodiment of the present invention can be applied. In FIG. 25, each of the lens groups of the zoom lens 1 of the first embodiment are shown simply as a single lens. It is needless to say that not only the zoom lens 1 of the first embodiment, but also the zoom lenses 2–6 of the second to the sixth embodiment, respectively, and the zoom lenses to which the present invention is applied, which are configured in the forms other than those of the embodiments shown in the present specification can be used.

A signal for focus control of the electric signal formed by the imaging device 30 is transmitted to a control circuit 50 by an image separation circuit 40, and a signal for an image is transmitted to an image processing circuit. The signal transmitted to the image processing circuit is processed into a form suitable for subsequent processing, and is subjected to various kinds of processing such as display by a display device, recording into a recording medium, transfer by communication means, and the like.

Operation signals from the outside such as the operation of a zoom button are input into the control circuit 50, and various kinds of processing are performed according to the operation signals. For example, when a zooming instruction by the zoom button is input, the control circuit 50 operates drive units 61, 71 and 81 through driver circuits 60, 70 and 80 so as to make the zoom lens be in a focus distance based on the instruction, and moves each of the lens groups GR2, GR3 and GR4 to predetermined positions. The position information of each of the lens groups GR2, GR3 and GR4 acquired by each of sensors 62, 72 and 82 is input into the control circuit 50, and are referred to when instruction signals are output to the driver circuits 60, 70 and 80. Moreover, the control circuit 50 checks a focus state on the basis of a signal transmitted from the image separation circuit 40, and operates the drive units 61, 71 and 81 through the driver circuits 60, 70 and 80, respectively, to perform the position control of each of the lens groups GR2, GR3 and GR4.

The imaging apparatus 10 is equipped with a camera shake correction function. For example, when camera shake detection means 90 such as a gyro sensor, detects a shake of the imaging device 30 caused by, for example, the depressing of a shutter release button, a signal from the camera shake detection means 90 is input into the control circuit 50, and the control circuit 50 calculates a shake correction angle for compensating the shake of an image caused by the camera shake. The control circuit 50 operates a drive unit 101 through a driver circuit 100 in order to situate the second lens group GR2 or the third lens group GR3 at the position based on the calculated shake correction angle, and moves the lens group GR2 or GR3 in a direction perpendicular to the optical axis. The positions of the lens group GR2 or GR3, the shake of which is corrected, has been detected by a sensor 102, and the position information of the shift lens group GR2 or GR3 acquired by the sensor 102 is input into the control circuit 50. The position information is referred to when the control circuit 50 transmits an instruction signal to the driver circuit 100.

The imaging apparatus 10 mentioned above can take various forms as a practical product. For example, the imaging apparatus 10 can be widely applied as a camera unit of digital input-output equipment such as a digital still camera, a digital video camera, a camera-equipped mobile phone, a personal digital assistant (PDA) in which a camera is incorporated, and the like.

In addition, any of a practical shape of each unit of each of the embodiments and specific numerical values of each of the numerical examples are shown as only examples of concretization performed at the time of implementing the present invention. The scope of the present invention should not be interpreted to be limitative to those embodiments and examples.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising at least a first lens group, a second lens group, and a third lens group arranged in the order from an object side, in which said first lens group includes a reflection member for bending an optical axis fixedly during zooming and has a negative refractive power, and said second lens group has a negative refractive power, wherein:

an image can be shifted in a direction perpendicular to said optical axis by moving either of said second and said third lens groups (hereinafter referred to as a "shift lens group") in a direction perpendicular to the optical axis, and a following conditional expression (1) is satisfied, $$0.5 < (1-\beta a) \times \beta b < 3.0, \tag{1}$$

where:

$\beta a$: a magnification of said shift lens group in a maximum telephoto state, and $\beta b$: a magnification of a lens group arranged on an image surface side of said shift lens group in the maximum telephoto state.

2. The zoom lens according to claim 1, further comprising a fourth lens group having a positive refractive power, wherein:

said third lens group has a positive refractive power, and said first lens group, said second lens group, said third lens group, and said fourth lens group are arranged in the order from the object side.

3. The zoom lens according to either one of claim 1 and claim 2, wherein:

said zoom lens satisfies a following conditional expression (2):

$$0.1 < |f1/f2| < 1.2, \tag{2}$$

where f1: a focus distance of said first lens group, f2: a focus distance of said second lens group.

4. The zoom lens according to any one of claims 1 to 3, wherein:

said zoom lens satisfies a following conditional expression (3), $$3.8 < |f1/fw| < 5.0, \tag{3}$$

where f1: a focus distance of said first lens group, fw: a focus distance of a whole lens system in a maximum wide angle state.

5. An imaging apparatus equipped with a zoom lens and an imaging device which converts an optical image formed by said zoom lens into an electric signal, wherein:

said zoom lens includes at least a first lens group, a second lens group and a third lens group, arranged in the order from an object, in which said first lens group includes a reflection member for bending an optical axis fixedly during zooming and has a negative refractive power, and said second lens group has a negative refractive power, wherein:

an image can be shifted in a direction perpendicular to said optical axis by moving either of said second and said third lens groups (hereinafter referred to as a "shift lens group") in a direction perpendicular to said optical axis, and a following conditional expression (1) is satisfied, $$0.5 < (1-\beta a) \times \beta b < 3.0 \qquad (1)$$

where:

$\beta\alpha$: a magnification of said shift lens group in a maximum telephoto state, and $\beta b$: a magnification of a lens group arranged on an image surface side of said shift lens group in the maximum telephoto state.

6. The imaging apparatus according to claim 5, further comprising:

camera shake detection means for detecting a shake of said imaging device;

camera shake correction control means which calculates a shake correction angle for correcting image blurring caused by the shake of said imaging device detected by said camera shake detection means to transmit a drive signal to a drive unit so as to situate said shift lens group at a position based on the shake correction angle; and a camera shake correction drive unit which shift said shift lens group in a direction perpendicular to said optical axis based on the drive signal.

* * * * *

UNITED STATES PATENT AND TRADEMARK OFFICE
CERTIFICATE OF CORRECTION

PATENT NO. : 7,218,455 B2
APPLICATION NO. : 11/455038
DATED : May 15, 2007
INVENTOR(S) : Yoshito Iwasawa It is certified that error appears in the above-identified patent and that said Letters Patent is hereby corrected as shown below:

Column 1, Line 9:
"which being incorporated" should read -- which are incorporated --.

Column 1, Line 23:
"achieves dimensions" should read -- achieves their dimensions --.

Column 1, Line 26:
"In recent years, an" should read -- In recent years, demand for an --.

Column 1, Line 28:
-- Along with the wide spread of the digital still camera, -- should be inserted.

Column 1, Line 28:
"The" should read -- an --.

Column 1, Line 28:
"a higher image quality" should read -- with a higher image quality has been requested --.

Column 1, Line 29:
"along with such wide spread of the digital still camera" should be deleted.

Column 1, Line 32:
"especially" should read -- especially, --

Column 1, Line 34:
"and has an excellent image" should read -- and with an excellent image --.

Column 1, Line 35:
"performance" should read -- performance, --.

Column 1, Line 53:
"i.e." should read -- i.e., --.

Column 1, Line 54:
"considerable" should read -- difficult --.

Column 1, Line 64:
"deterioration" should read -- deterioration, --.

UNITED STATES PATENT AND TRADEMARK OFFICE
CERTIFICATE OF CORRECTION

PATENT NO. : 7,218,455 B2
APPLICATION NO. : 11/455038
DATED : May 15, 2007
INVENTOR(S) : Yoshito Iwasawa It is certified that error appears in the above-identified patent and that said Letters Patent is hereby corrected as shown below:

Column 1, Line 64:
"decentrating of each composed lens" should read -- decentrating each of the composed lens --.

Column 1, Line 65:
"group" should read -- group, --.

Column 1, Line 65:
"if it is tried" should be deleted.

Column 1, Line 67:
"assemblability with" should be deleted.

Column1, Line 67:
"a high precision" should read -- a high precision assembly --.

Column 2, Line 3:
"as" should be deleted.

Column 2, Line 6:
"equipment" should read -- equipment, --.

Column 2, Line 8:
"dimensions being thin" should read -- dimensions that are thin --.

Column 2, Line 9:
"has good assemblagebility" should read -- has a good assemblage --.

Column 2, Line 23:
"and" should read -- or --.

Column 2, Line 33:
"dimensions being thin" should read -- dimensions that are thin --.

Column 2, Line 34:
"namely can be" should read -- namely they can be --.

Column 2, Line 58:
"the" should be deleted.

UNITED STATES PATENT AND TRADEMARK OFFICE
CERTIFICATE OF CORRECTION

PATENT NO. : 7,218,455 B2
APPLICATION NO. : 11/455038
DATED : May 15, 2007
INVENTOR(S) : Yoshito Iwasawa It is certified that error appears in the above-identified patent and that said Letters Patent is hereby corrected as shown below:

Column 2, Line 61:
"According to further another" should read -- According to a further --.

Column 3, Line 34:
"is diagrams" should read -- shows diagrams --.

Column 3, Line 40:
"is diagrams" should read -- shows diagrams --.

Column 3, Line 44:
"is diagrams" should read -- shows diagrams --.

Column 3, Line 48:
"is diagrams" should read -- shows diagrams --.

Column 3, Line 54:
"is diagrams" should read -- shows diagrams --.

Column 3, Line 62:
"is diagrams" should read -- shows diagrams --.

Column 4, Line 5:
"is diagrams" should read -- shows diagrams --.

Column 4, Line 9:
"is diagrams" should read -- shows diagrams --.

Column 4, Line 19:
"is diagrams" should read -- shows diagrams --.

Column 4, Line 23:
"is diagrams" should read -- shows diagrams --.

Column 4, Line 33:
"is diagrams" should read -- shows diagrams --.

Column 4, Line 37:
"is diagrams" should read -- shows diagrams --.

UNITED STATES PATENT AND TRADEMARK OFFICE
CERTIFICATE OF CORRECTION

PATENT NO. : 7,218,455 B2
APPLICATION NO. : 11/455038
DATED : May 15, 2007
INVENTOR(S) : Yoshito Iwasawa It is certified that error appears in the above-identified patent and that said Letters Patent is hereby corrected as shown below:

Column 4, Line 47:
"is diagrams" should read -- shows diagrams --.

Column 4, Line 65:
"and" should read -- or --.

Column 5, Line 21:
"large," should read -- larger, --.

Column 5, Line 22:
"large" should read -- larger --.

Column 5, Line 25:
"an image shifts large" should read -- an image shift is larger --.

Column 5, Line 26:
"Consequently" should read -- Consequently, --.

Column 5, Line 26:
"the control in high precision" should read -- control with a high precision --.

Column 5, Line 44:
"the" should be deleted.

Column 6, Line 8:
"Although it is" should read -- It is --.

Column 22, Line 4:
"any of a practical shape" should read -- the practical shape --.

Column 22, Line 6:
"only examples" should read -- only concrete examples --.

Column 22, Line 7:
"concretization" should be deleted.

Column 22, Line 9:
"limitative" should read -- limited --.

UNITED STATES PATENT AND TRADEMARK OFFICE
CERTIFICATE OF CORRECTION

PATENT NO. : 7,218,455 B2
APPLICATION NO. : 11/455038
DATED : May 15, 2007
INVENTOR(S) : Yoshito Iwasawa It is certified that error appears in the above-identified patent and that said Letters Patent is hereby corrected as shown below:

Column 24, Line 15:
"shift" should read -- shifts --.

Signed and Sealed this

Eighteenth Day of December, 2007

JON W. DUDAS
*Director of the United States Patent and Trademark Office*